United States Patent
Takehara et al.

(12)
(10) Patent No.: US 6,942,948 B2
(45) Date of Patent: Sep. 13, 2005

(54) NONAQUEOUS ELECTROLYTE SOLUTION AND SECONDARY BATTERY EMPLOYING THE SAME

(75) Inventors: Masahiro Takehara, Ibaraki (JP); Takashi Fujii, Ibaraki (JP); Minoru Kotato, Ibaraki (JP); Daisuke Noda, Ibaraki (JP); Shinichi Kinoshita, Ibaraki (JP); Makoto Ue, Ibaraki (JP); Hitoshi Suzuki, Ibaraki (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 10/383,555

(22) Filed: Mar. 10, 2003

(65) Prior Publication Data

US 2003/0165733 A1 Sep. 4, 2003

Related U.S. Application Data

(63) Continuation of application No. PCT/JP02/06906, filed on Jul. 8, 2002.

(30) Foreign Application Priority Data

Jul. 10, 2001 (JP) ........................................ 2001-208992
Jul. 16, 2001 (JP) ........................................ 2001-214638

(51) Int. Cl.$^7$ ................................................ H01M 6/16
(52) U.S. Cl. ...................... 429/328; 429/329; 429/330; 429/337; 429/231.8; 429/231.95
(58) Field of Search ................................ 429/328, 329, 429/330, 337, 231.8, 231.95

(56) References Cited

U.S. PATENT DOCUMENTS

| 4,895,778 A | * | 1/1990 | Nalewajek | .................. 429/188 |
| 5,731,106 A | | 3/1998 | Tsutsumi et al. | |
| 6,045,945 A | | 4/2000 | Hamamoto et al. | |
| 2002/0086216 A1 | * | 7/2002 | Sekino et al. | ................ 429/330 |

FOREIGN PATENT DOCUMENTS

| JP | 59-224073 | * | 12/1984 |
| JP | 62-22375 | * | 1/1987 |
| JP | 62-22376 | * | 1/1987 |
| JP | 62-217578 | | 9/1987 |
| JP | 5-315006 | | 11/1993 |
| JP | 7-105977 | | 4/1995 |
| JP | 7-211351 | | 8/1995 |
| JP | 7-283083 | | 10/1995 |
| JP | 8-321438 | | 12/1996 |
| JP | 8-321440 | | 12/1996 |
| JP | 9-106833 | | 4/1997 |
| JP | 10-50344 | | 2/1998 |
| JP | 10-270075 | | 10/1998 |
| JP | 11-185810 | | 7/1999 |
| JP | 2000-12080 | * | 1/2000 |
| JP | 2000-40526 | * | 2/2000 |
| JP | 2000-235868 | | 8/2000 |
| JP | 2001-52741 | | 2/2001 |
| JP | 2001-60464 | | 3/2001 |
| JP | 2001-126762 | | 5/2001 |

OTHER PUBLICATIONS

Product Brochure published by Mitsubishi Petrochemical Co., Ltd., pp. 1–29, Sep. 1994 (with partial English translation of pp. 4 , 5 and 20).

* cited by examiner

*Primary Examiner*—Laura Weiner
(74) *Attorney, Agent, or Firm*—Oblon, Spivak, McClelland, Maier & Neustadt, P.C.

(57) ABSTRACT

A nonaqueous electrolyte solution for secondary batteries which is an electrolyte solution for secondary batteries obtained by dissolving a lithium salt in a nonaqueous solvent, wherein the nonaqueous solvent is a solvent mainly comprising a lactone compound and the content of hydroxy carboxylic acids in the electrolyte solution is 1 mmol/kg or lower and a secondary battery employing the same are excellent in high-temperature storage characteristics, cycle characteristics, and capacity retention characteristics and in various cell characteristics in a wide temperature range and safety such as firing properties.

19 Claims, No Drawings

NONAQUEOUS ELECTROLYTE SOLUTION AND SECONDARY BATTERY EMPLOYING THE SAME

This application is a continuation of PCT/JP02/06906 filed Jul. 8, 2002.

TECHNICAL FIELD

The present invention relates to a nonaqueous electrolyte solution and a secondary battery employing the same. More particularly, the invention relates to a specific nonaqueous electrolyte solution and a nonaqueous-electrolyte-solution secondary battery which, because of the electrolyte solution employed therein, is excellent in high-temperature storage characteristics, cycle characteristics, and capacity retention characteristics and in various cell characteristics in a wide temperature range and safety such as firing properties and has a high energy density.

BACKGROUND ART

With the recent trend toward weight reduction and size reduction in electrical products, the desire for development of a lithium secondary battery having a high energy density is becoming stronger than before. There also is a desire for improvements in various cell characteristics as a result of the spread of fields to which lithium secondary batteries are applied.

Nonaqueous-electrolyte-solution secondary batteries presently proposed employ a metal oxide salt such as $LiCoO_2$, $Li_2Mn_2O_4$, or $LiNiO_2$ for the positive electrode and further employ lithium metal or a compound capable of occluding and releasing lithium ions, such as a carbonaceous material, e.g., coke, artificial graphite, or natural graphite, or a metal oxide material, e.g., an oxide of Sn or Si, for the negative electrode.

In those nonaqueous-electrolyte-solution secondary batteries, ethylene carbonate is frequently used as the main solvent for the electrolyte solutions because of the high permittivity thereof. However, since ethylene carbonate has a high solidifying point, is solid at room temperature when used alone, and has a high viscosity, the electrolyte solutions employing ethylene carbonate as a solvent usually are ones in which the ethylene carbonate is used as a mixed solvent containing as a co-solvent a low-viscosity solvent such as a dialkyl carbonate, e.g., diethyl carbonate. However, since low-viscosity solvents generally have a low boiling point and a low permittivity, addition thereof in a large amount not only reduces the degree of dissociation of the lithium salt, resulting in reduced electrolyte solution performances, but also poses problems concerning salt precipitation caused by solvent volatilization, safety due to a lowered flash point, etc. Conversely, addition in too small an amount poses problems concerning low-temperature electrical conductivity and viscosity.

On the other hand, lactone compounds such as γ-butyrolactone have a sufficiently high permittivity, although inferior to ethylene carbonate, and have a low solidifying point and low viscosity. Such lactone compounds can hence exhibit sufficient electrolyte solution performances without being mixed with a low-viscosity solvent. As a result, such lactone compounds are excellent solvents which compare favorably in performance with electrolyte solutions employing a solvent obtained by mixing ethylene carbonate with a low-viscosity solvent.

Consequently, an electrolyte solution employing γ-butyrolactone as the main solvent and containing as a co-solvent about from 15 to 35% by volume ethylene carbonate and a nonaqueous-electrolyte-solution secondary battery employing this electrolyte solution have been proposed (Japanese Patent Laid-Open No. 31525/1999).

However, the electrolyte solution employing γ-butyrolactone is inferior in electrochemical oxidation resistance and reduction resistance to the electrolyte solutions employing a solvent obtained by mixing ethylene carbonate with a low-viscosity solvent. The γ-butyrolactone-based electrolyte solution hence has problems concerning, e.g., cell capacity retention at high temperatures, and a further improvement has been desired.

DISCLOSURE OF THE INVENTION

An object of the invention is to provide a nonaqueous-electrolyte-solution secondary battery which employs a lactone compound as a nonaqueous solvent and which has been improved in high-temperature cell capacity retention, etc., is excellent in various cell characteristics in a wide temperature range and safety such as firing properties, and has a high energy density.

It is known that a lactone compound, when it contains water, undergoes equilibrium reactions in which part thereof reacts with water to undergo ring cleavage and thereby yield a chain hydroxy carboxylic acid compound.

It has hence been presumed as a matter of course that a hydroxy carboxylic acid is contained also in electrolyte solutions containing a lactone compound. However, no report has been made to the effect that the content of the acid in an electrolyte solution was precisely determined and the relationship between this content and cell performances was examined. Especially in electrolyte solutions containing an Li salt, not only there is a fear that the water content therein may be higher than in the lactone compound itself used because of inclusion of the salt, but also there is a possibility that an equilibrium reaction might proceed further due to the influence of the Li salt.

The present inventors have found that in an electrolyte solution employing a nonaqueous solvent mainly comprising a lactone compound, the electrochemical oxidation resistance.reduction resistance of this electrolyte solution, which contains a hydroxy carboxylic acid, deteriorates with increasing hydroxy carboxylic acid amount and this impairs the cell performances and is a cause of a decrease in high-temperature capacity retention. As a result of further intensive investigations, it has been found that the problems can be mitigated by regulating the total content of such hydroxy carboxylic acids to a specific amount. The invention has been thus completed.

Namely, an essential point of the invention resides in a nonaqueous electrolyte solution for secondary batteries which is an electrolyte solution for secondary batteries obtained by dissolving a lithium salt in a nonaqueous solvent, characterized in that the nonaqueous solvent is a solvent mainly comprising a lactone compound and the content of hydroxy carboxylic acids in the electrolyte solution is 1 mmol/kg or lower.

Another essential point of the invention resides in a nonaqueous-electrolyte-solution secondary battery comprising at least a negative electrode comprising lithium metal, a lithium alloy, or a material capable of occluding and releasing lithium, a positive electrode comprising a material capable of occluding and releasing lithium, and an electrolyte solution obtained by dissolving a lithium salt in a nonaqueous solvent, characterized in that the nonaqueous solvent is a solvent mainly comprising a lactone compound and the content of hydroxy carboxylic acids in the electrolyte solution is 1 mmol/kg or lower.

BEST MODE FOR CARRYING OUT THE INVENTION

Modes for carrying out the invention will be explained below in detail.

The nonaqueous electrolyte solution of the invention is an electrolyte solution for secondary batteries which is obtained by dissolving a lithium salt in a nonaqueous solvent, and is characterized in that the nonaqueous solvent is a solvent mainly comprising a lactone compound and the content of hydroxy carboxylic acids in the electrolyte solution is 1 mmol/kg or lower.

Since hydroxy carboxylic acids have poor electrochemical oxidation resistance/reduction resistance, the cell performances deteriorate when the electrolyte solution contains a hydroxy carboxylic acid. Because of this, it is necessary to reduce the content thereof in the electrolyte solution to 1 mmol/kg or lower. The content thereof is more preferably 0.8 mmol/kg or lower, even more preferably 0.5 mmol/kg or lower. A content thereof regulated to an even lower level, e.g., 0.1 mmol/kg or below, is presumed to theoretically bring about favorable results. However, not only such a low level is not easy to industrially realize and determination is difficult in that region, but also a significant difference in influence on cell performances is not observed. It is therefore preferred in actual production to regulate the content to a value in the range of from 0.1 to 0.5 mmol/kg.

Such hydroxy carboxylic acids are thought to be ones which were originally contained in starting materials for the lactone compounds or ones yielded by the ring cleavage of the lactone compounds through hydrolysis, etc. These hydroxy carboxylic acids can be determined through analysis, for example, by a method in which an appropriate eluent is selected to analyze the electrolyte solution by ion chromatography, or trimethylsilylation is conducted under appropriate conditions and the resultant compounds are analyzed by gas chromatography. Consequently, the term "hydroxy carboxylic acids in the electrolyte solution" as used in the invention implies all of the hydroxy carboxylic acids and hydroxy carboxylic acid derivatives, e.g., hydroxy carboxylic acid salts, contained in the electrolyte solution. From an analytical standpoint, that term means all compounds determined as hydroxy carboxylic acid anions.

For reducing the content of hydroxy carboxylic acids in the electrolyte solution to 1 mmol/kg or lower, use can be made of a method such as, e.g., precision distillation with a multistage distillation column.

Lactone compound solvents not only are preferred from the standpoint of the degree of Li dissociation because the degree of dissociation into Li ions therein is high, but also are free from the drawbacks accompanying the system comprising a mixture of ethylene carbonate and a low-viscosity solvent, such as a low boiling point, high volatility, liability to salt precipitation, or problems concerning safety, for example, because the system further has enhanced flammability due to the high volatility.

It is therefore preferred to select a nonaqueous-solvent combination which brings about sufficient cell performances, while regulating the content of a lactone compound in the nonaqueous solvent to preferably 60% by weight or higher, more preferably 70% by weight or higher, most preferably: 80% by weight or higher.

Examples of the lactone compound in the invention include 5- to 7-membered ring compounds such as γ-butyrolactone, γ-valerolactone, δ-valerolactone, γ-caprolactone, δ-caprolactone, and ε-caprolactone. These may be used alone or in combination of two or more thereof. In the invention, it is more preferred that the lactone compound(s) in the nonaqueous solvent should comprise at least 60% by weight γ-butyrolactone because this nonaqueous solvent is more effective in mitigating the problems such as those shown above. Furthermore, the nonaqueous solvent more preferably comprises 60% by weight or more γ-butyrolactone.

When those lactone compounds are used, they hydrolyze to yield the respective hydroxy carboxylic acids. Examples of the acids include γ-hydroxybutyric acid from γ-butyrolactone, γ-hydroxyvaleric acid from γ-valerolactone, δ-hydroxyvaleric acid from δ-valerolactone, γ-hydroxycaproic acid from γ-caprolactone, δ-hydroxycaproic acid from δ-caprolactone, and ε-hydroxycaproic acid from ε-caprolactone.

The nonaqueous solvent can comprise a combination of the lactone compound with other solvent.

Examples of such solvents include high-permittivity solvents having a dielectric constant of 25 or higher. These high-permittivity solvents preferably are ones having about from 2 to 10 carbon atoms. Specific examples thereof include alkylene carbonates such as ethylene carbonate, propylene carbonate, and butylene carbonate, sulfolane, 3-methylsulfolane, dimethyl sulfoxide, and the like. These solvents may be used in combination of two or more thereof. Preferred of these are ethylene carbonate and propylene carbonate from the standpoint of improving cell characteristics such as cycle characteristics. On the other hand, alkylene carbonate solvents such as ethylene carbonate and propylene carbonate have a drawback that they are difficult to handle because of their high viscosity. In addition, nonaqueous electrolyte solutions containing these alkylene carbonates in a large amount are apt to generate a gas and are hence unsuitable for use in sealed lithium-ion secondary batteries. Consequently, alkylene carbonates such as ethylene carbonate and propylene carbonate may be incorporated into the nonaqueous solvent in such an amount as to result in a content thereof of generally 30% by weight or lower. The content thereof is preferably 20% by weight or lower, especially preferably 15% by weight or lower.

The nonaqueous solvent can further contain a solvent other than high-permittivity solvent. Usable as such solvents are, for example, dialkyl carbonates having about 3 to 10 carbon atoms, such as dimethyl carbonate, diethyl carbonate, di-n-propyl carbonate, diisopropyl carbonate, n-propyl isopropyl carbonate, di-n-butyl carbonate, diisobutyl carbonate, di-t-butyl carbonate, n-butyl isobutyl carbonate, n-butyl t-butyl carbonate, isobutyl t-butyl carbonate, ethyl methyl carbonate, methyl n-propyl carbonate, n-butyl methyl carbonate, isobutyl methyl carbonate, t-butyl methyl carbonate, ethyl n-propyl carbonate, n-butyl ethyl carbonate, isobutyl ethyl carbonate, t-butyl ethyl carbonate, n-butyl n-propyl carbonate, isobutyl n-propyl carbonate, t-butyl n-propyl carbonate, n-butyl isopropyl carbonate, isobutyl isopropyl carbonate, and t-butyl isopropyl carbonate; cyclic ethers having about 3 to 10 carbon atoms, such as tetrahydrofuran and 2-methyltetrahydrofuran; chain ethers having about 3 to 10 carbon atoms, such as dimethoxyethane, 1,2-dimethoxymethane, diethoxymethane, 1,2-diethoxyethane, ethoxymethoxymethane, and ethoxymethoxyethane; chain esters having about 3 to 10 carbon atoms, such as methyl acetate, ethyl acetate, n-propyl acetate, isopropyl acetate, n-butyl acetate, isobutyl acetate, t-butyl acetate, methyl propionate, ethyl propionate, n-propyl propionate, isopropyl propionate, n-butyl propionate, isobutyl propionate, and t-butyl propionate; and the like. The dialkyl carbonates each preferably is one in which each alkyl group has 1 to 4 carbon atoms.

It is also preferred in the invention that a nitrogen-containing aromatic heterocyclic compound or a nitrogen-containing heterocyclic compound represented by the following formula (I) be contained in the electrolyte solution for the purposes of improving high-temperature storage characteristics and enabling the efficient formation of a coating film having permeability to lithium ions and satisfactory stability on electrode surfaces even in initial charge, or for another purpose.

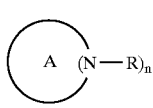

(I)

(In the formula, A represents a nitrogen-containing heterocycle having a carbonyl group, R represents an alkyl group, an alkenyl group, or a (hetero)aryl group, and n represents a natural number, provided that when n is 2 or larger, the R's may be different from each other.)

The nitrogen-containing aromatic heterocyclic compound is a compound having as part of its structure an aromatic heterocycle containing one or more nitrogen atoms in the ring. This compound may be monocyclic or polycyclic. In the case where the compound is polycyclic, it is not particularly limited as long as it has one or more aromatic rings containing a nitrogen atom. The heterocyclic compound may have a substituent as long as this does not inhibit the effects of the invention. Preferred nitrogen-containing aromatic heterocyclic compounds have a total carbon number of generally about from 4 to 30, especially about from 4 to 20.

Specific examples of the nitrogen-containing aromatic heterocyclic compound include the following.
(a) Compounds Having Six-Membered Aromatic Ring Skeleton Containing One Nitrogen Atom (Pyridine Skeleton)

Examples thereof include pyridine, quinoline, isoquinoline, acridine, phenanthridine, 1,7-phenanthroline, 1,10-phenanthroline, 4,7-phenanthroline, α-picoline, β-picoline, γ-picoline, 2-acetylpyridine, 3-acetylpyridine, 4-acetylpyridine, 2-phenylpyridine, 3-phenylpyridine, 4-phenylpyridine, 2,6-di-t-butyl-4-methylpyridine, and the like.
(b) Compounds Having Six-Membered Aromatic Ring Skeleton Containing Two Nitrogen Atoms Examples thereof include pyridazine, pyrimidine, pyrazine, cinnoline, phthalazine, quinazoline, quinoxaline, 3-methylpyridazine, 4-methylpyridazine, 3-acetylpyridazine, 4-acetylpyridazine, 3-phenylpyridazine, 4-phenylpyridazine, 2-methylpyrimidine, 4-methylpyrimidine, 5-methylpyrimidine, 2-acetylpyrimidine, 4-acetylpyrimidine, 5-acetylpyrmidine, 2-phenylpyrimidine, 4-phenylpyrimidine, 5-phenylpyrimidine, 2-methylpyrazine, 2-acetylpyrazine, 2-phenylpyrazine, and the like.
(c) Compounds Having Six-membered Aromatic Ring Skeleton Containing Three or More Nitrogen Atoms Examples thereof include 1,2,3-triazine, 1,2,4-triazine, 1,3,5-triazine, benzotriazine, 4-methyl-1,2,3-triazine, 5-methyl-1,2,3-triazine, 4-acetyl-1,2,3-triazine, 5-acetyl-1,2,3-triazine, 4-phenyl-1,2,3-triazine, 5-phenyl-1,2,3-triazine, 1,2,4,5-tetrazine, 3-methyl-1,2,4,5-tetrazine, 3-acetyl-1,2,4,5-tetrazine, 3-phenyl-1,2,4,5-tetrazine, and the like.

(d) Compounds Having Five-membered Aromatic Ring Skeleton Containing One Nitrogen Atom (Pyrrole Skeleton)

Examples thereof include pyrrole, 1-methylpyrrole, 1-vinylpyrrole, 2-methylpyrrole, 3-methylpyrrole, 1-phenylpyrrole, 1-vinylpyrrole, 1-acetylpyrrole, indole, 1-methylindole, 2-methylindole, 3-methylindole, 6-methylindole, carbazole, 1-methylcarbazole, oxazole, thiazole, isoxazole, isothiazole, benzoxazole, benzisoxazole, anthranil, benzthiazole, 1,2-benzisothiazole, 2,3-benzisothiazole, and the like.
(e) Compounds Having Five-Membered Aromatic Ring Skeleton Containing Two Nitrogen Atoms Examples thereof include imidazole, pyrazole, 1,2,3-oxadiazole, 1,2,3-thiadiazole, 1,2,5-oxadiazole, 1,2,5-thiadiazole, 1,2,4-oxadiazole, 1,2,4-thiadiazole, 1,3,4-oxadiazole, 1,3,4-thiadiazole, N-methylimidazole, N-phenylimidazole, N-vinylimidazole, N-acetylimidazole, benzimidazole, isoindazole, indazole, benzofurazane, and the like.
(f) Compounds Having Five-Membered Aromatic Ring Skeleton Containing Three or More Nitrogen Atoms Examples thereof include 1H-1,2,3-triazole, 2H-1,2,3-triazole, 1H-1,2,4-triazole, 4H-1,2,4-triazole, 1,2,3,4-oxatriazole, 1,2,4,5-oxatriazole, 1,2,3,4-thiatriazole, 1,2,4,5-thiatriazole, 1-benztriazole, 2-benztriazole, 2H-1,2,3,4-tetrazole, 1-methyl-1H-1,2,3-triazole, 1-vinyl-1H-1,2,3-triazole, 1-acetyl-1H-1,2,3-trizole, 1-phenyl-1H-1,2,3-triazole, and the like.

Those nitrogen-containing aromatic heterocyclic compounds may be used as a mixture of two or more thereof, and may be used without separating inclusions which are difficult to separate.

The content of those aromatic heterocyclic compounds in the nonaqueous solvent is from 0.01 to 10% by weight, preferably from 0.05 to 8% by weight, more preferably from 0.1 to 5% by weight. In case where the amount thereof is too small, a sufficient coating film cannot be formed. When the amount thereof is too large, there are cases where the heterocyclic compounds remaining after coating film formation exert adverse influences on cell characteristics.

In the compound represented by general formula (I), the nitrogen-containing heterocycle having a carbonyl group which is represented by A may be a monocycle or may have been fused with a benzene ring or the like. The number of carbonyl groups in the ring is usually from 1 to 4.

Specific examples of the nitrogen-containing heterocycle include pyrrolidine, imidazolidine, oxazolidine, thiazolidine, piperidine, pyrimidine, oxazine, (iso)indoline, benzimidazole, benzoxazole, benzthiazole, quinoline, quinazoline, benzoxazine, and the like.

In the case where R in the compound represented by general formula (I) represents an alkyl group, this alkyl group is an optionally substituted alkyl group having 1 to 4 carbon atoms, preferably methyl or ethyl.

In the case where R represents an alkenyl group, this alkenyl group is an optionally substituted alkenyl group having 2 to 4 carbon atoms, preferably vinyl.

In the case where R represents a (hetero)aryl group, this (hetero)aryl group is an optionally substituted phenyl or pyridyl group, in which the total number of carbon atoms is generally about from 6 to 20, especially about from 6 to 10.

Specific examples of the nitrogen-containing heterocyclic compound represented by general formula (I) include the following compounds.
(g) Pyrrolidine Compounds 1-Alkyl(or alkenyl)pyrrolidone compounds such as 1-methyl-2-pyrrolidone, 1-ethyl-2-pyrrolidone, 1-vinyl-2- pyrrolidone, 1,5-dimethyl-2-pyrrolidone, 1-isopropyl-2-pyrrolidone, 1-n-butyl-2-pyrrolidone, 1-methyl-3-pyrrolidone, 1-ethyl-3-pyrrolidone, and 1-vinyl-3-pyrrolidone; 1-arylpyrrolidone compounds such as 1-phenyl-2-pyrrolidone and 1-phenyl-3-pyrrolidone; N-alkylsuccinimide compounds such as N-methylsuccinimide, N-ethylsuccinimide, N-cyclohexylsuccinimide, and N-isobutylsuccinimide; N-alkenylsuccinimide compounds such as N-vinylsuccinimide; and N-(hetero)arylsuccinimide compounds such as N-phenylsuccinimide, N-(p-tolyl)succinimide, and N-(3-pyridyl)succinimide.

(h) (Iso)indolinone Compounds

1-Alkyl(or alkenyl)indolinone compounds such as 1-methyl-2-indolinone, 1-ethyl-2-indolinone, 1-vinyl-2-indolinone, 1-methyl-3-indolinone, 1-ethyl-3-indolinone, and 1-vinyl-3-indolinone; 1-arylindolinone compounds such as 1-phenyl-2-indolinone; N-alkylphthalimide compounds such as N-methylphthalimide and N-ethylphthalimide; N-alkenylphthalimide compounds such as N-vinylphthalimide; and N-arylphthalimide compounds such as N-phenylphthalimide.

(i) Imidazolidine Compounds 1,3-Dialkyl(or alkenyl)imidazolidine-2,5-dione compounds such as 1,3-dimethylimidazolidine-2,5-dione, 1-ethyl-3-methylimidazolidine-2,5-dione, 1,3-diethylimidazolidine-2,5-dione, and 1,3-divinylimidazolidine-2,5-one; 1-alkyl-3-arylimidazolidine-2,5-dione compounds such as 1-methyl-3-phenylimidazolidine-2,5-dione; 1,3-diarylimidazolidine-2,5-dione compounds such as 1,3-diphenylimidazolidine-2,5-dione; 1,3-dialkyl(or alkenyl)imidazolidinone compounds such as 1,3-dimethyl-2-imidazolidinone, 1-ethyl-3-methyl-2-imidazolidinone, 1,3-diethyl-2-imidazolidinone, 1,3-divinyl-2-imidazolidinone, 1,3-dimethyl-4-imidazolidinone, 1-ethyl-3-methyl-4-imidazolidinone, 3-ethyl-1-methyl-4-imidazolidinone, 1,3-diethyl-4-imidazolidinone, and 1,3-divinyl-4-imidazolidinone; 1(3)-alkyl-3(1)-arylimidazolidinone compounds such as 1-methyl-3-phenyl-2-imidazolidinone, 1-methyl-3-phenyl-4-imidazolidinone, and 3-methyl-1-phenyl-4-imidazolidinone; and 1,3-diarylimidazolidinone compounds such as 1,3-diphenyl-2-imidazolidinone and 1,3-diphenyl-4-imidazolidinone.

(j) Benzimidazole Compounds 1,3-Dialkyl(or alkenyl)-2,3-dihydrobenzimidazol-2-one compounds such as 1,3-dimethyl-2,3-dihydrobenzimidazol-2-one, 1-ethyl-3-methyl-2,3-dihydrobenzimidazol-2-one, 1,3-diethyl-2,3-dihydrobenzimidazol-2-one, and 1,3-divinyl-2,3-dihydrobenzimidazol-2-one; 1-alkyl-3-aryl-2,3-dihydrobenzimidazol-2-one compounds such as 1-methyl-3-phenyl-2,3-dihydrobenzimidazol-2-one; and 1,3-diaryl-2,3-dihydrobenzimidazol-2-one compounds such as 1,3-diphenyl-2,3-dihydrobenzimidazol-2-one.

(k) Oxazolidine Compounds

3-Alkyloxazolidone compounds such as 3-methyl-2-oxazolidone, 3-ethyl-2-oxazolidone, 3-methyl-4-oxazolidone, 3-ethyl-4-oxazolidone, 3-methyl-5-oxazolidone, and 3-ethyl-5-oxazolidone; 3-alkenyloxazolidone compounds such as 3-vinyl-2-oxazolidone, 3-vinyl-4-oxazolidone, and 3-vinyl-5-oxazolidone; 3-aryloxazolidone compounds such as 3-phenyl-2-oxazolidone, 3-phenyl-4-oxazolidone, and 3-phenyl-5-oxazolidone; 3-alkyl(or alkenyl)oxazolidinedione compounds such as 3-methyloxazolidine-2,4-dione, 3-ethyloxazolidine-2,4-dione, 3-vinyloxazolidine-2,4-dione, 3-methyloxazolidine-2,5-dione, 3-ethyloxazolidine-2,5-dione, and 3-vinyloxazolidine-2,5-dione; and 3-aryloxazolidinedione compounds such as 3-phenyloxazolidine-2,4-dione and 3-phenyloxazolidine-2,5-dione.

(l) Benzoxazole Compounds

3-Alkyl(or alkenyl)-2,3-dihydrobenzoxazole compounds such as 3-methyl-2,3-dihydrobenzoxazol-2-one, 3-ethyl-2,3-dihydrobenzoxazol-2-one, and 3-vinyl-2,3-dihydrobenzoxazol-2-one; and 3-aryl-2,3-dihydrobenzoxazol-2-one compounds such as 3-phenyl-2,3-dihydrobenzoxazol-2-one.

(m) Thiazolidine Compounds

3-Alkyl(or alkenyl)thiazolidone compounds such as 3-methyl-2-thiazolidone, 3-ethyl-2-thiazolidone, 3-vinyl-2-thiazolidone, 3-methyl-4-thiazolidone, 3-ethyl-4-thiazolidone, 3-vinyl-4-thiazolidone, 3-methyl-5-thiazolidone, 3-ethyl-5-thiazolidone, and 3-vinyl-5-thiazolidone; 3-arylthiazolidone compounds such as 3-phenyl-2-thiazolidone, 3-phenyl-4-thiazolidone, and 3-phenyl-5-thiazolidone; 3-alkyl(or alkenyl)thiazolidinedione compounds such as 3-methylthiazolidine-2,4-dione, 3-ethylthiazolidine-2,4-dione, 3-vinylthiazolidine-2,4-dione, 3-methylthiazolidine-2,5-dione, 3-ethylthiazolidine-2,5-dione, and 3-vinylthiazolidine-2,5-dione; and 3-arylthiazolidinedione compounds such as 3-phenylthiazolidine-2,4-dione and 3-phenylthiazolidine-2,5-dione.

(n) Benzthiazole Compounds

3-Alkyl(or alkenyl)-2,3-dihydrobenzthiazol-2-one compounds such as 3-methyl-2,3-dihydrobenzthiazol-2-one and 3-vinyl-2,3-dihydrobenzthiazol-2-one; and 3-aryl-2,3-dihydrobenzthiazol-2-one compounds such as 3-phenyl-2,3-dihydrobenzthiazol-2-one.

(o) Piperidine Compounds 1-(Substituted)alkyl(or alkenyl)piperidone compounds such as 1-methyl-2-piperidone, 1-ethyl-2-piperidone, 1-vinyl-2-piperidone, 1-methyl-3-piperidone, 1-ethyl-3-piperidone, 1-vinyl-3-piperidone, 1-methyl-4-piperidone, 1-ethyl-4-piperidone, 1-vinyl-4-piperidone, 1-morpholinomethyl-2-piperidone, and 1-piperidinomethyl-2-piperidone; and 1-arylpiperidone compounds such as 1-phenyl-2-piperidone, 1-phenyl-3-piperidone, and 1-phenyl-4-piperidone.

(p) Quinoline Compounds 3,4-Dihydro-1-alkylquinolone compounds such as 3,4-dihydro-1-methyl-2-quinolone, 3,4-dihydro-1-methyl-3-quinolone, and 3,4-dihydro-1-methyl-quinolin-4-one; and 3,4-dihydro-1-arylquinolone compounds such as 3,4-dihydro-1-phenyl-2-quinolone, 3,4-dihydro-1-phenyl-3-quinolone, and 3,4-dihydro-1-phenyl-4-quinolone.

(q) Pyrimidine Compounds 1,3-Dialkyl(or alkenyl)hexahydropyrimidinone compounds such as 1,3-dimethylhexahydropyrimidin-2-one, 1,3-diethylhexahydropyrimidin-2-one, 1,3-divinylhexahydropyrimidin-2-one, 1,3-dimethylhexahydropyrimidin-4-one, 1-ethyl-3-methylhexahydropyrimidin-4-one, 3-ethyl-1-methylhexahydropyrimidin-4-one, 1,3-diethylhexahydropyrimidin-4-one, 1,3-divinylhexahydropyrimidin-4-one, 1,3-dimethylhexahydropyrimidin-5-one, 1-ethyl-3-methylhexahydropyrimidin-5-one, 1,3-diethylhexahydropyrimidin-5-one, and 1,3-divinylhexahydropyrimidin-5-one; 1-alkyl-3-arylhexahydropyrimidinone compounds such as 1-methyl-3-phenylhexahydropyrimidin-2-one, 1-methyl-3-phenylhexahydropyrimidin-4-one, 3-methyl-1-phenylhexahydropyrimidin-4-one, and 1-methyl-3- phenylhexahydropyrimidin-5-one; 1,3-diarylhexahydropyrimidinone compounds such as 1,3-diphenylhexahydropyrimidin-2-one, 1,3-diphenylhexahydropyrimidin-4-one, and -1,3-diphenylhexahydropyrimidin-5-one; 1,3-dialkyl(or alkenyl) hexahydropyrimidinedione compounds such as 1,3-dimethylhexahydropyrimidine-2,4-dione, 1,3-diethylhexahydropyrimidine-2,4-dione, 1-ethyl-3-methylhexahydropyrimidine-2,4-dione, 3-ethyl-1-methylhexahydropyrimidine-2,4-dione, 1,3-divinylhexahydropyrimidine-2,4-dione, 1,3-dimethylhexahydropyrimidine-2,5-dione, 1-ethyl-3-methylhexahydropyrimidine-2,5-dione, 1,3-diethylhexahydropyrimidine-2,5-dione, and 1,3-divinylhexahydropyrimidine-2,5-dione; 1(3)-alkyl-3(1)-arylhexahydropyrimidinedione compounds such as 1-methyl-3-phenylhexahydropyrimidine-2,4-dione, 3-methyl-1-phenylhexahydroyrimidine-2,4-dione, and 1-methyl-3-phenylhexahydropyrimidine-2,5-dione; 1,3-diarylhexahydropyrimidinedione compounds such as 1,3-diphenylhexahydropyrimidine-2,4-dione and 1,3-diphenylhexahydropyrimidine-2,5-dione; 1,3-dialkyl(or alkenyl)hexahydropyrimidinetrione compounds such as 1,3-dimethylhexahydropyrimidine-2,4,5-trione, 1,3-diethylhexahydropyrimidine-2,4,5-trione, 1-ethyl-3-methylhexahydropyrimidine-2,4,5-trione, 3-ethyl-1-methylhexahydropyrimidine-2,4,5-trione, 1,3-divinylhexahydropyrimidine-2,4,5-trione, 1,3-dimethylhexahydropyrimidine-2,4,6-trione, 1,3-diethylhexahydropyrimidine-2,4,6-trione, 1-ethyl-3-methylhexahydropyrimidine-2,4,6-trione, 3-ethyl-1-methylhexahydropyrimidine-2,4,6-trione, and 1,3-divinylhexahydropyrimidine-2,4,6-trione; 1(3)-alkyl-3(1)-arylhexahydropyrimidinetrione compounds such as 1-methyl-3-phenylhexahydropyrimidine-2,4,5-trione, 3-methyl-1-phenylhexahydropyrimidine-2,4,5-trione, 1-methyl-3-phenylhexahydropyrimidine-2,4,6-trione, and 3-methyl-1-phenylhexahydropyrimidine-2,4,6-trione; 1,3-diarylhexahydropyrimidinetrione compounds such as 1,3-diphenylhexahydropyrimidine-2,4,5-trione and 1,3-diphenylhexahydropyrimidine-2,4,6-trione; 1,3-dialkyl(or alkenyl)hexahydropyrimidinetetraone compounds such as 1,3-dimethylhexahydropyrimidinetetraone, 1,3-diethylhexahydropyrimidinetetraone, 1-ethyl-3-methylhexahydropyrimidinetetraone, and 1,3-divinylhexahydropyrimidinetetraone; 1(3)-alkyl-3(1)-arylhexahydropyrimidinetetraone compounds such as 1-methyl-3-phenylhexahydropyrimidinetetraone; and 1,3-diarylhexahydropyrimidinetetraone compounds such as 1,3-diphenylhexahydropyrimidinetetraone.

(r) Quinazoline Compounds 1,3-Dialkyl(or alkenyl)-1,2,3,4-tetrahydroquinazolinone compounds such as 1,3-dimethyl-1,2,3,4-tetrahydroquinazolin-2-one, 1,3-diethyl-1,2,3,4-tetrahydroquinazolin-2-one, 1-ethyl-3-methyl-1,2,3,4-tetrahydroquinazolin-2-one, 3-ethyl-1-methyl-1,2,3,4-tetrahydroquinazolin-2-one, 1,3-divinyl-1,2,3,4-tetrahydroquinazolin-2-one, 1,3-dimethyl-1,2,3,4-tetrahydroquinazolin-4-one, 1,3-diethyl-1,2,3,4-tetrahydroquinazolin-4-one, 1-ethyl-3-methyl-1,2,3,4-tetrahydroquinazolin-4-one, 3-ethyl-1-methyl-1,2,3,4-tetrahydroquinazolin-4-one, and 1,3-divinyl-1,2,3,4-tetrahydroquinazolin-4-one; 1(3)-alkyl-3(1)-aryl-1,2,3,4-tetrahydroquinazolinone compounds such as 1-methyl-3-phenyl-1,2,3,4-tetrahydroquinazolin-2-one, 3-methyl-1-phenyl-1,2,3,4-tetrahydroquinazolin-2-one, 1-methyl-3-phenyl-1,2,3,4-tetrahydroquinazolin-4-one, and 3-methyl-1-phenyl-1,2,3,4-tetrahydroquinazolin-4-one; 1,3-diaryl-1,2,3,4-tetrahydroquinazolinone compounds such as 1,3-diphenyl-1,2,3,4-tetrahydroquinazolin-2-one and 1,3-diphenyl-1,2,3,4-tetrahydroquinazolin-4-one; 1,3-dialkyl(or alkenyl)-1,2,3,4-tetrahydroquinazoline-2,4-dione compounds such as 1,3-dimethyl-1,2,3,4-tetrahydroquinazoline-2,4-dione, 1,3-diethyl-1,2,3,4-tetrahydroquinazoline-2,4-dione, 1-ethyl-3-methyl-1,2,3,4-tetrahydroquinazoline-2,4-dione, 3-ethyl-1-methyl-1,2,3,4-tetrahydroquinazoline-2,4-dione, and 1,3-divinyl-1,2,3,4-tetrahydroquinazoline-2,4-dione; 1(3)-alkyl-3(1)-aryl-1,2,3,4-tetrahydroquinazoline-2,4-dione compounds such as 1-methyl-3-phenyl-1,2,3,4-tetrahydroquinazoline-2,4-dione and 3-methyl-1-phenyl-1,2,3,4-tetrahydroquinazoline-2,4-dione; and 1,3-diaryl-1,2,3,4-tetrahydroquinazoline-2,4-dione compounds such as 1,3-diphenyl-1,2,3,4-tetrahydroquinazoline-2,4-dione.

(s) Oxazine Compounds

N-Alkyloxazinone compounds such as 2-methyl-2H-3,4,5,6-tetrahydro-1,2-oxazin-3-one, 2-ethyl-2H-3,4,5,6-tetrahydro-1,2-oxazin-3-one, 2-vinyl-2H-3,4,5,6-tetrahydro-1,2-oxazin-3-one, 2-methyl-2H-3,4,5,6-tetrahydro-1,2-oxazin-4-one, 2-ethyl-2H-3,4,5,6-tetrahydro-1,2-oxazin-4-one, 2-vinyl-2H-3,4,5,6-tetrahydro-1,2-oxazin-4-one, 2-methyl-2H-3,4,5,6-tetrahydro-1,2-oxazin-5-one, 2-ethyl-2H-3,4,5,6-tetrahydro-1,2-oxazin-5-one, 2-vinyl-2H-3,4,5,6-tetrahydro-1,2-oxazin-5-one, 2-methyl-2H-3,4,5,6-tetrahydro-1,2-oxazin-6-one, 2-ethyl-2H-3,4,5,6-tetrahydro-1,2-oxazin-6-one, 2-vinyl-2H-3,4,5,6-tetrahydro-1,2-oxazin-6-one, 3-methyl-2H-3,4,5,6-tetrahydro-1,3-oxazin-2-one, 3-ethyl-2H-3,4,5,6-tetrahydro-1,3-oxazin-2-one, 3-vinyl-2H-3,4,5,6-tetrahydro-1,3-oxazin-2-one, 3-methyl-2H-3,4,5,6-tetrahydro-1,3-oxazin-4-one, 3-ethyl-2H-3,4,5,6-tetrahydro-1,3-oxazin-4-one, 3-vinyl-2H-3,4,5,6-tetrahydro-1,3-oxazin-4-one, 3-methyl-2H-3,4,5,6-tetrahydro-1,3-oxazin-5-one, 3-ethyl-2H-3,4,5,6-tetrahydro-1,3-oxazin-5-one, 3-vinyl-2H-3,4,5,6-tetrahydro-1,3-oxazin-5-one, 3-methyl-2H-3,4,5,6-tetrahydro-1,3-oxazin-6-one, 3-ethyl-2H-3,4,5,6-tetrahydro-1,3-oxazin-6-one, 3-vinyl-2H-3,4,5,6-tetrahydro-1,3-oxazin-6-one, 4-methyl-2H-3,4,5,6-tetrahydro-1,4-oxazin-2-one, 4-ethyl-2H-3,4,5,6-tetrahydro-1,4-oxazin-2-one, 4-vinyl-2H-3,4,5,6-tetrahydro-1,4-oxazin-2-one, 4-methyl-2H-3,4,5,6-tetrahydro-1,4-oxazin-3-one, 4-ethyl-2H-3,4,5,6-tetrahydro-1,4-oxazin-3-one, and 4-vinyl-2H-3,4,5,6-tetrahydro-1,4-oxazin-3-one; and N-aryloxazinone compounds such as 2-phenyl-2H-3,4,5,6-tetrahydro-1,2-oxazin-3-one, 2-phenyl-2H-3,4,5,6-tetrahydro-1,2-oxazin-4-one, 2-phenyl-2H-3,4,5,6-tetrahydro-1,2-oxazin-5-one, 2-phenyl-2H-3,4,5,6-tetrahydro-1,2-oxazin-6-one, 3-phenyl-2H-3,4,5,6-tetrahydro-1,3-oxazin-2-one, 3-phenyl-2H-3,4,5,6-tetrahydro-1,3-oxazin-4-one, 3-phenyl-2H-3,4,5,6-tetrahydro-1,3-oxazin-5-one, 3-phenyl-2H-3,4,5,6-tetrahydro-1,3-oxazin-6-one, 4-phenyl-2H-3,4,5,6-tetrahydro-1,4-oxazin-2-one, and 4-phenyl-2H-3,4,5,6-tetrahydro-1,4-oxazin-3-one.

(t) Benzoxazine Compounds

4-Alkyl(or alkenyl)-1,4-benzoxazine compounds such as 4-methyl-2,3-dihydro-4H-1,4-benzoxazin-2-one, 4-ethyl-2,3-dihydro-4H-1,4-benzoxazin-2-one, 4-vinyl-2,3-dihydro-4H-1,4-benzoxazin-2-one, 4-methyl-2,3-dihydro-4H-1,4-benzoxazin-3-one, 4-ethyl-2,3-dihydro-4H-1,4-benzoxazin-3-one, and 4-vinyl-2,3-dihydro-4H-1,4-benzoxazin-3-one; and 4-aryl-1,4-benzoxazine compounds such as 4-phenyl-2,3-dihydro-4H-1,4-benzoxazin-2-one and 4-phenyl-2,3-dihydro-4H-1,4-benzoxazin-3-one.

Preferred of those nitrogen-containing heterocycles are 1-methyl-2-pyrrolidone, 1-vinyl-2-pyrrolidone, 3-methyl-2- oxazolidone, 3-vinyl-2-oxazolidone, 1,3-dimethyl-2-imidazolidinone, 1,3-divinyl-2-imidazolidinone, 1,3-dimethylhexahydropyrimidin-2-one, 1,3-divinylhexahydropyrimidin-2-one, 3-methyl-2H-3,4,5,6-tetrahydro-1,3-oxazin-2-one, and 3-vinyl-2H-3,4,5,6-tetrahydro-1,3-oxazin-2-one.

In the case where nitrogen-containing heterocyclic compounds represented by general formula (I) are used, they may be used either alone or in combination of two or more thereof. However, these compounds are used so that the amount of these present in the nonaqueous solvent is generally from 0.1 to 10% by weight, preferably from 0.5 to 5% by weight.

The nitrogen-containing heterocyclic compound represented by general formula (I) is presumed to form on an electrode surface a coating film which is permeable to lithium ions and satisfactorily stable and thereby inhibit decomposition of the electrolyte solution. When the amount of this compound present in the electrolyte solution is too small, there are cases where coating film formation is incomplete and the desired effect is not sufficiently produced. Conversely, too large amounts thereof adversely influence cell characteristics.

Various additives may be further mixed with the nonaqueous solution, such as, for example, a film-forming agent which is thought to form a coating film on electrode surfaces to inhibit solvent decomposition on the electrodes, an overcharge inhibitor, a dehydrant, a deoxidizer, and the like.

Preferably used as the film-forming agent is an unsaturated cyclic carbonate such as vinylene carbonate, cyclic sulfite such as ethylene sulfite, cyclic saturated carbonate having an unsaturated hydrocarbon group, such as vinylethylene carbonate, cyclic sultone such as propanesultone, phenylethylene carbonate, cyclic carboxylic acid anhydride, or the like. As the cyclic carboxylic acid anhydride is used succinic anhydride, maleic anhydride, glutaric anhydride, trimellitic anhydride, phthalic anhydride, or the like. The film-forming agent may be incorporated into the nonaqueous solvent in an amount of from 0.1 to 10% by weight, more preferably from 0.1 to 8% by weight, whereby the capacity retention and cycle characteristics of the battery become satisfactory.

As the overcharge inhibitor can be incorporated aromatic compounds such as the benzene derivatives shown in Japanese Patent Laid-Open Nos. 203560/1996, 302614/1995, 50822/1997, 273700/1996, 17447/1997, etc., the biphenyl and derivatives thereof shown in Japanese Patent Laid-Open Nos. 106835/1997, 171840/1997, 321258/1998, 302614/1995 and 162512/1999, Japanese Patent Nos. 2,939,469 and 2,963,898, etc., the pyrrole derivatives shown in Japanese Patent Laid-Open Nos. 45369/1997, 321258/1998, etc., and the aniline derivatives shown in Japanese Patent Laid-Open Nos. 320778/1995, 302614/1995, etc.; the ether compounds shown in Japanese Patent No. 2,983,205, etc.; and other compounds such as those shown in Japanese Patent Laid-Open No. 2001-15158. The overcharge inhibitor is preferably incorporated in such an amount as to result in a content thereof in the nonaqueous solvent of from 0.1 to 5% by weight.

It is preferred in the invention that the nonaqueous solvent should contain a compound selected from the group consisting of vinylene carbonate compounds and vinylethylene carbonate compounds for the purpose of providing a lithium secondary battery excellent in high-temperature storage characteristics and cycle characteristics.

The vinylene carbonate compounds are vinylene carbonate and compounds comprising vinylene carbonate and a substituent bonded to the 3-position and/or 4-position thereof. Examples thereof include vinylene carbonate compounds represented by general formula (II).

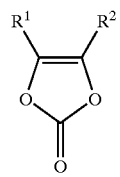

(II)

(In the formula, $R^1$ and $R^2$ each independently represents a hydrogen atom or an alkyl group having 1 to 4 carbon atoms.)

In general formula (II), $R^1$ and $R^2$ each independently represents a hydrogen atom or an alkyl group having 1 to 4 carbon atoms. In the case where $R^1$ and $R^2$ are alkyl groups having 1 to 4 carbon atoms, examples thereof include methyl, ethyl, n-propyl, isopropyl, n-butyl, sec-butyl, and tert-butyl. Preferred of these are methyl and ethyl.

Specific examples of vinylene carbonate compounds represented by such general formula (II) include vinylene carbonate, methylvinylene carbonate, ethylvinylene carbonate, 4,5-dimethylvinylene carbonate, 4,5-diethylvinylene carbonate, and the like. Preferred of these are vinylene carbonate and 4,5-dimethylvinylene carbonate. Especially preferred is vinylene carbonate. These may be used as a mixture of two or more thereof.

The vinylethylene carbonate compounds are compounds comprising ethylene carbonate and a vinyl group bonded to the 3-position and/or 4-position thereof and compounds comprising this skeleton and a substituent bonded thereto. Examples thereof include vinylethylene carbonate compounds represented by the following general formula (III).

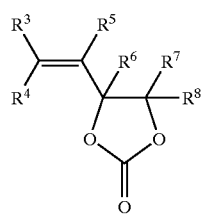

(III)

(In the formula, $R^3$, $R^4$, and $R^5$ each independently represents a hydrogen atom or an alkyl group having 1 to 4 carbon atoms, and $R^6$, $R^7$, and $R^8$ each independently represents a hydrogen atom, an alkyl group having 1 to 4 carbon atoms, or an alkenyl group having 2 to 7 carbon atoms.)

In general formula (III), $R^3$, $R^4$, and $R^5$ each independently represents a hydrogen atom or an alkyl group having 1 to 4 carbon atoms, and $R^6$, $R^7$, and $R^8$ each independently represents a hydrogen atom, an alkyl group having 1 to 4 carbon atoms, or an alkenyl group having 2 to 7 carbon atoms. In the case where $R^3$, $R^4$, $R^5$, $R^6$, $R^7$, and R8 are alkyl groups having 1 to 4 carbon atoms, examples thereof include methyl, ethyl, n-propyl, isopropyl, n-butyl, sec-butyl, and tert-butyl. Preferred of these are methyl and ethyl.

In the case where $R^6$, $R^7$, and $R^8$ are alkenyl groups having 2 to 7 carbon atoms, examples thereof include vinyl, 1-methylvinyl, 2-methylvinyl, propenyl, 1-methylpropenyl, 2-methylpropenyl, 3-methylpropenyl, butenyl, and the like. Specific examples of vinylethylene carbonate compounds represented by such general formula (III) include 4-vinylethylene carbonate, 4-methyl-4-vinylethylene carbonate, 4-ethyl-4-vinylethylene carbonate, 4-n-propyl-4-vinylethylene carbonate, 5-methyl-4-vinylethylene carbonate, 4,4-divinylethylene carbonate, 4,5-divinylethylene carbonate, and the like. Preferred of these are 4-vinylethylene carbonate, 4-methyl-4-vinylethylene carbonate, and 4,5-divinylethylene carbonate. Especially preferred is 4-vinylethylene carbonate.

A mixture of two more compounds of general formula (II), a mixture of two or more compounds of general formula (III), or a mixture of one or more compounds of general formula (II) with one or more compounds of general formula (III) may be used.

In the case where a vinylene carbonate compound represented by general formula (II) and/or a vinylethylene carbonate compound represented by general formula (III) are used in the invention, the content thereof in the nonaqueous solvent is not particularly limited. However, the content thereof is preferably from 0.01 to 5% by weight based on the total solvent weight. The term total solvent weight means the total weight of the nonaqueous solvent part on the assumption that the electrolyte solution is composed of the nonaqueous solvent and the lithium salt as the solute.

It is preferred in the invention that the nonaqueous solvent should contain a compound selected from the group consisting of phenylethylene carbonate compounds, phenylvinylene carbonate compounds, and acid anhydrides for the purpose of providing a lithium secondary battery excellent in high-temperature storage characteristics and cycle characteristics.

The phenylethylene carbonate compounds are compounds comprising an ethylene carbonate skeleton having a (substituted) phenyl group in the 3-position and/or 4-position thereof. Examples thereof include phenylethylene carbonate compounds represented by the following general formula (IV).

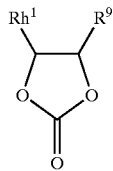

(IV)

(In the formula, Ph$^1$ represents a phenyl group which may have an alkyl group, and R$^9$ represents any of a hydrogen atom, an alkyl group having 1 to 4 carbon atoms, and a phenyl group which may have an alkyl group.)

In general formula (IV), Ph$^1$ represents a phenyl group which may have an alkyl group. Although these alkyl groups are not particularly limited in kind or number, they preferably are alkyl groups having 1 to 8 carbon atoms. Examples thereof include methyl, ethyl, propyl, butyl, hexyl, and the like. Preferred of these are methyl and ethyl.

Examples of the phenyl group which may have an alkyl group include optionally alkyl-substituted phenyl groups having a total carbon number of from 6 to 14, such as phenyl, methylphenyl, ethylphenyl, propylphenyl, butylphenyl, hexylphenyl, and dimethylphenyl.

Furthermore, R$^9$ represents a hydrogen atom, an alkyl group having 1 to 4 carbon atoms, or a phenyl group which may have an alkyl group. Examples of the alkyl group having 1 to 4 carbon atoms include methyl, ethyl, n-propyl, isopropyl, n-butyl, isobutyl, sec-butyl, and tert-butyl.

With respect to the phenyl group which may have an alkyl group, the same definition as for Ph$^1$ holds.

Specific examples of such phenylethylene carbonate compounds include phenylethylene carbonate, 4,5-diphenylethylene carbonate, 5-methyl-4-phenylethylene carbonate, 5-ethyl-4-phenylethylene carbonate, and the like.

The phenylvinylene carbonate compounds are compounds comprising a vinylene carbonate skeleton having a (substituted) phenyl group in the 3-position and/or 4-position thereof. Examples thereof include phenylvinylene carbonate compounds represented by the following general formula (V).

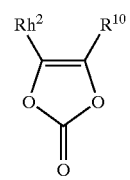

(V)

(In the formula, Ph2 represents a phenyl group which may have an alkyl group, and R$^{10}$ represents any of a hydrogen atom, an alkyl group having 1 to 4 carbon atoms, and a phenyl group which may have an alkyl group.)

In general formula (V), Ph$^2$ represents a phenyl group which may have an alkyl group. Although these alkyl groups are not particularly limited in kind or number, they preferably are alkyl groups having 1 to 8 carbon atoms. Examples thereof include methyl, ethyl, propyl, butyl, hexyl, and the like. Preferred of these are methyl and ethyl.

Examples of the phenyl group which may have an alkyl group include optionally alkyl-substituted phenyl groups having a total carbon number of from 6 to 14, such as phenyl, methylphenyl, ethylphenyl, propylphenyl, butylphenyl, hexylphenyl, and dimethylphenyl.

Furthermore, R$^{10}$ represents a hydrogen atom, an alkyl group having 1 to 4 carbon atoms, or a phenyl group which may have an alkyl group. Examples of the alkyl group having 1 to 4 carbon atoms include methyl, ethyl, n-propyl, isopropyl, n-butyl, isobutyl, sec-butyl, and tert-butyl.

With respect to the phenyl group which may have an alkyl group, the same definition as for Ph$^2$ holds.

Specific examples of such phenylvinylene carbonate compounds include phenylvinylene carbonate, 4,5-diphenylvinylene carbonate, 5-methyl-4-phenylvinylene carbonate, 5-ethyl-4-phenylvinylene carbonate, and the like.

In the invention, a mixture of two or more compounds of general formula (IV), a mixture of two or more compounds of general formula (V), or a mixture of one or more compounds of general formula (IV) with one or more compounds of general formula (V) may be used.

In the case where at least one cyclic carbonate compound selected from the phenylethylene carbonate compounds represented by general formula (IV) and the phenylvinylene carbonate compounds represented by general formula (V) is incorporated, the content thereof also is not particularly limited. Preferably, the content thereof is from 0.01 to 5% by weight based on the total solvent weight.

In the case where an acid anhydride is incorporated in the invention, the kind thereof is not particularly limited. A compound having two or more acid anhydride structures per molecule may also be used. Examples of acid anhydrides usable in the invention include acid anhydrides having a total carbon number of about from 4 to 30, especially about from 4 to 20, such as acetic anhydride, propionic anhydride, butyric anhydride, succinic anhydride, glutaric anhydride, maleic anhydride, citraconic anhydride, glutaconic anhydride, itaconic anhydride, diglycolic anhydride, cyclohexanedicarboxylic anhydride, cyclopentanetetracarboxylic dianhydride, 4-cyclohexene-1,2-dicarboxylic anhydride, 3,4,5,6-tetrahydrophthalic anhydride, 5-norbornene-2,3-dicarboxylic anhydride, phenylsuccinic anhydride, 2-phenylglutaric anhydride, phthalic anhydride, and pyromellitic anhydride. Preferred of these are succinic anhydride, glutaric anhydride, and maleic anhydride. These acid anhydrides may be used as a mixture of two or more thereof.

The content of acid anhydrides in the nonaqueous solvent in the invention is not particularly limited. However, the content thereof is preferably from 0.01 to 5% by weight based on the total solvent weight.

The nonaqueous solvent in the invention preferably is either one which contains a compound selected from the group consisting of vinylene carbonate compounds represented by formula (II) given above and vinylethylene carbonate compounds represented by formula (III) given above and further contains a phenylethylene carbonate compound represented by formula (IV) given above and a phenylvinylene carbonate compound represented by formula (V) given above or one which contains a compound selected from the group consisting of vinylene carbonate compounds represented by formula (II) given above and vinylethylene carbonate compounds represented by formula (III) given above and further contains the acid anhydride, from the standpoint that these nonaqueous solvents further improve high-temperature storage characteristics.

A nonionic fluorochemical surfactant can be further added to the nonaqueous electrolyte solution in the invention for the purpose of reducing the surface tension of the electrolyte solution to improve the ability of the electrolyte solution to infiltrate into electrodes.

Nonionic fluorochemical surfactants which can be added to the electrolyte solution are surfactants in which the hydrogen atoms of the hydrocarbon group serving as a hydrophobic group have been wholly or partly replaced with fluorine atoms and which are exceedingly effective in reducing surface tension. These surfactants further have advantages that they are excellent in heat resistance, chemical resistance, and oxidation resistance and are less susceptible to decomposition within batteries. Since ionic fluorochemical surfactants have insufficient solubility in electrolyte solutions, a nonionic fluorochemical surfactant is used in the invention. Such nonionic fluorochemical surfactants are not particularly limited, and examples thereof include perfluoroalkyl polyoxyethylene ethanols, perfluoroalkyl carboxylic acid esters, partly-fluorinated-alkyl polyoxyethylene ethanols, partly-fluorinated-alkyl carboxylic acid esters, and the like. Preferred of these are perfluoroalkyl polyoxyethylene ethanols and perfluoroalkyl carboxylic acid esters.

In the case where a nonionic fluorochemical surfactant is added to the electrolyte solution, at least one of these preferably is a polyoxyethylene ether which has a perfluoroalkyl group and is represented by the following general formula (VI):

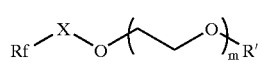
(VI)

(wherein R' is a hydrogen atom or a methyl group; X is a nonionic bivalent connecting group having a molecular weight of 200 or lower and made up of one or more elements selected from H, C, O, N, P, and S; Rf is a perfluoroalkyl group; and m is the number of the oxyethylene units). More preferably, m is from 2 to 10 and Rf has 2 to 10 carbon atoms.

This polyoxyethylene ether having a perfluoroalkyl group may contain, as by-products, ones in which the number of oxylene units m is smaller than 2 or larger than 10. It may further contain, as by-products, a perfluoroalkyl group Rf having less than 2 or more than 10 carbon atoms. The total amount of such by-products is generally 10% by weight or smaller, preferably 5% by weight or smaller, more preferably 2% by weight or smaller, based on the total weight of the polyoxyethylene ether including the by-products.

The perfluoroalkyl group Rf of the polyoxyethylene ether represented by general formula (VI) given above is an alkyl group whose hydrogen atoms have been wholly replaced with fluorine atoms. It is exceedingly effective in reducing surface tension and can enhance the ability of the electrolyte solution to infiltrate into electrodes. The perfluoroalkyl group further has advantages that it is excellent in heat resistance, chemical resistance, and oxidation resistance and is less susceptible to decomposition within batteries. From the standpoint of not inhibiting lithium ions from diffusing within batteries, the perfluoroalkyl group Rf to be used is one having 2 to 10 carbon atoms, preferably 4 to 8 carbon atoms.

From the standpoint of not inhibiting lithium ions from diffusing within batteries, the polyoxyethylene ether represented by general formula (VI) to be used is one in which the number of oxyethylene units m is from 2 to 10, preferably from 2 to 8, more preferably from 2 to 6.

In the polyoxyethylene ether represented by general formula (VI) given above, the connecting group X between the perfluoroalkyl group and the polyoxyethylene chain preferably is a nonionic one because an ionic connecting group makes the compound have insufficient solubility in the electrolyte solution. From the standpoint of the stability of the compound, the connecting group preferably is one constituted of one or more elements selected from hydrogen, carbon, oxygen, nitrogen, phosphorus, and sulfur. From the standpoint of lithium ion diffusibility, the connecting group preferably is one having a molecular weight of 200 or lower. Examples of the connecting group X include alkylenes, N-alkylsulfonamides, monohydroxyalkylenes, ethers, thioethers, amines, carboxylic acid esters, phosphoric esters, sulfuric esters, and the like. Preferred of these are alkylenes, N-alkylsulfonamides, and monohydroxyalkylenes. In the case of an alkylene group or monohydroxyalkylene group, the number of carbon atoms therein is preferably from 1 to 8, more preferably from 1 to 6, especially preferably from 1 to 4. In the case of an N-alkylsulfonamide, the number of carbon atoms in the alkyl group bonded to the nitrogen atom is preferably from 1 to 6, more preferably from 1 to 4.

In the case where a nonionic fluorochemical surfactant is added to the nonaqueous electrolyte solution, the addition amount is preferably from 0.001 to 2% by weight, more preferably from 0.001 to 1.0% by weight, based on the total weight of the nonaqueous solvent. The especially preferred range thereof from the standpoint of cell performances is from 0.001 to 0.2% by weight.

A lithium salt is used in the invention as a solute in the electrolyte solution. The lithium salt is not particularly limited as long as it is usable as a solute for the electrolyte solution. Examples thereof include, for example, the following.

(1) Inorganic-lithium salts: Inorganic fluoride salts such as $LiPF_6$, $LiAsF_6$, $LiBF_4$, $LiTaF_6$, $LiAlF_4$, $LiAlF_6$, and $LiSiF_6$ and perhalogen acid salts such as $LiClO_4$.

(2) Organic lithium salts: Organic sulfonic acid salts such as $LiCF_3SO_3$, perfluoroalkylsulfonimide salts such as LiN$(CF_3SO_2)_2$, LiN$(C_2F_5SO_2)_2$, and LiN$(CF_3SO_2)$$(C_4F_9SO_2)$, perfluoroalkylsulfonic acid methide salts such as LiC$(CF_3SO_2)_3$, salts formed by replacing part of the fluorine atoms of an inorganic fluoride salt with a perfluoroalkyl group, such as $LiPF_3(CF_3)_3$, $LiPF_3(C_2F_5)_3$, $LiBF_2(CF_3)_2$, $LiBF_2(C_2F_5)_2$, and $LiBF_3(CF_3)$, and lithium tetrakis(perfluorocarboxylate)borate salts such as $LiB(CF_3COO)_4$, $LiB(OCOCF_2COO)_2$, and $LiB(OCOC_2F_4COO)_2$.

Those solutes may be used as a mixture of two or more thereof.

Preferred of those from the standpoints of resolution, degree of dissociation into ions, and electrical conductivity characteristics are $LiPF_6$, $LiBF_4$, $LiN(CF_3SO_2)_2$, $LiN(C_2F_5SO_2)_2$, $LiN(CF_3SO_2)(C_4F_9SO_2)$, $LiPF_3(CF_3)_3$, $LiPF_3(C_2F_5)_3$, $LiBF_2(C_2F_5)_2$, and $LiB(OCOCF_2COO)_2$. More preferred are $LiPF_6$ and $LiBF_4$.

Although $LiPF_6$ and $LiBF_4$ each can be used alone in the invention, use of these in combination can bring about satisfactory high-temperature storage characteristics. When this combination is used, the proportion of $LiBF_4$ in the lithium salts is desirably 65% by weight or higher. When the proportion of $LiBF_4$ is lower than that, there are cases where the desired improvement in high-temperature characteristics is not obtained. The proportion of $LiBF_4$ is preferably 70% by weight or higher, especially preferably 75% by weight or higher. The upper limit of $LiBF_4$ proportion may be about 99% by weight, and is more preferably 97% by weight or lower, especially 95% by weight or lower.

On the other hand, the proportion of $LiPF_6$ in the case of use in combination is desirable 1% by weight or higher. It is preferred to use it so as to result in 3% by weight or higher, especially 5% by weight or higher. The upper limit of $LiPF_6$ proportion is about 35% by weight, and it is more preferably used so as to result in 30% by weight or lower, especially 25% by weight or lower. When the proportion of $LiPF_6$ in the lithium salts is either too higher or too low, there are cases where the desired improvement in high-temperature characteristics is not obtained.

In the case where a nonaqueous solvent comprising 60% by weight or more γ-butyrolactone was selected, it is preferred that $LiBF_4$ should account for 50% by weight or more of the whole lithium salts.

Of the lithium salts other than $LiPF_6$ and $LiBF_4$, the inorganic lithium salts represented by the general formula $LiMF_n$, give $MF^{n-}$ part hydrolyzates which have poor electrochemical oxidation resistance/reduction resistance in the electrolyte solution. Consequently, the content of these lithium salts is preferably as low as possible. The content of these hydrolyzates in the electrolyte solution is preferably 1,000 ppm or lower, especially 100 ppm or lower.

The concentration of the lithium salt as a solute in the electrolyte solution of the invention is desirably from 0.5 to 3 mol/l. Too low concentrations thereof are undesirable in that the electrolyte solution has an insufficient electrical conductivity due to an absolute deficiency in concentration. Too high concentrations thereof are undesirable in that the resultant increase in viscosity lowers the electrical conductivity and precipitation is apt to occur at low temperatures, resulting in reduced cell performances.

The nonaqueous-electrolyte-solution secondary battery of the invention will be explained next.

The material of the negative electrode serving as a component of the secondary battery of the invention is not particularly limited. However, the material preferably is one comprising a material capable of occluding/releasing lithium. Specific examples thereof include, for example, carbonaceous materials such as pyrolysis products obtained from organic materials under various pyrolysis conditions, artificial graphites, and natural graphite, metal oxide materials, and lithium metal and various lithium alloys. Preferred carbonaceous materials of these are: artificial graphites produced by a high-temperature heat treatment of readily graphitizable pitches obtained from various starting materials; purified natural graphite; and materials obtained by subjecting these graphites to various surface treatments including pitch treatment.

Those graphite materials preferably are ones in which the value of d (interplanar spacing) for a lattice plane (002 plane) as determined through X-ray diffraction by a method of the Japan Society for Promotion of Scientific Research is generally from 0.335 to 0.34 nm, preferably from 0.335 to 0.337 nm. These graphite materials preferably have an ash content of generally 1% by weight or lower, more preferably 0.5% by weight or lower, most preferably 0.1% by weight or lower, and further have a crystallite size (Lc), as determined through X-ray diffraction by the method of the Japan Society for Promotion of Scientific Research, of 30 nm or larger. Furthermore, the crystallite size (Lc) is more preferably 50 nm or larger, most preferably 100 nm or larger.

The median diameters of those graphite materials are generally from 1 to 100 μm, preferably from 3 to 50 μm, more preferably from 5 to 40 μm, even more preferably from 7 to 30 μm, in terms of the median diameter determined by the laser diffraction•scattering method. The BET specific surface areas of the graphite materials are generally from 0.5 to 25.0 m$^2$/g, preferably from 0.7 to 20.0 m$^2$/g, more preferably from 1.0 to 15.0 m$^2$/g, even more preferably from 1.5 to 10.0 m$^2$/g. Furthermore, the graphite materials more preferably are ones in which in Raman spectroscopy with an argon ion laser light, the ratio of the intensity for the peak $P_A$ appearing in 1,580–1,620 cm$^{-1}$ range (peak intensity $I_A$) to the intensity for the peak $P_B$ appearing in the 1,350–1,370 cm$^{-1}$ range (peak intensity $I_B$), i.e., intensity ratio R (=$I_B/I_A$), is generally from 0 to 0.5 and the half-band width of the peak appearing in the 1,580–1,620 cm$^{-1}$ range is generally 26 cm$^{-1}$ or smaller, preferably 25 cm$^{-1}$ or smaller.

It is also possible to use a mixture of those carbonaceous materials with another negative-electrode material capable of occluding and releasing lithium.

Examples of the negative-electrode materials capable of occluding and releasing lithium, besides carbonaceous materials, include alloys of metals such as Ag, Zn, Al, Ga, In, Si, Ge, Sn, Pb, P, Sb, Bi, Cu, Ni, Sr, and Ba with Li, metal oxide materials such as oxides of these metals, and lithium metal. Preferred examples thereof include Sn oxides, Si oxides, Al oxide, lithium alloys of Sn, Si, or Al, and lithium metal.

Those negative-electrode materials may be used as a mixture of two or more thereof.

Methods for producing a negative electrode from those negative-electrode materials are not particularly limited. For example, a negative electrode can be produced by adding a binder, thickener, conductive material, solvent, and the like according to need to a negative-electrode material to obtain a slurry, applying the slurry to a current collector as a substrate, and drying the coating. Alternatively, the negative-electrode material may be subjected as it is to roll forming to form a sheet electrode or to compression molding to form a pellet electrode.

In the case where a binder is used in electrode production, it is not particularly limited as long as it is a material stable to the solvent to be used for electrode production and to the electrolyte solution and other materials to be used when the battery is used. Examples thereof include poly(vinylidene fluoride), polytetrafluoroethylene, styrene/butadiene rubbers, isoprene rubber, butadiene rubber, and the like.

In the case where a thickener is used in electrode production, it is not particularly limited as long as it is a material stable to the solvent to be used for electrode production and to the electrolyte solution and other materials to be used when the battery is used. Examples thereof include carboxymethyl cellulose, methyl cellulose, hydroxymethyl cellulose, ethyl cellulose, poly(vinyl alcohol), oxidized starch, phosphorylated starch, casein, and the like.

In the case where a conductive material is used in electrode production, it is not particularly limited as long as it is a material stable to the solvent to be used for electrode production and to the electrolyte solution and other materials to be used when the battery is used. Examples thereof include metallic materials such as copper and nickel and carbon materials such as graphite and carbon black.

As the material of the current collector for the negative electrode is used a metal such as copper, nickel, stainless steel, or the like. Preferred of these is a copper foil from the standpoints of formability into thin films and cost.

The material of the positive electrode serving as a component of the secondary battery of the invention is not particularly limited. However, it is preferred to use a material capable of occluding/releasing lithium, such as a lithium/transition metal composite oxide material, e.g., a lithium cobalt oxide, lithium nickel oxide, lithium manganese oxide, or the like. More preferred of these are $Li_xCoO_2$, $Li_xMnO_2$, $Li_xMn_2O_4$, $Li_xV_2O_5$, $Li_xTiS_2$, and the like. Especially preferred are $Li_xCoO_2$, $Li_xNiO_2$, and the like. Symbol x is a number of $0<x\leq 1$.

The lithium cobalt composite oxides and lithium nickel composite oxides which have a lamellar structure and are preferred positive-electrode active materials for use in the invention generally are ones having the basic empirical formula $LiCo_xO_2$ or $LiNiO_2$. These composite oxides may be ones in which the Co and Ni have been partly replaced with another element. Examples of the element with which the Co or Ni can be partly replaced include metal elements such as B, Al, Mg, Fe, Sn, Cr, Cu, Ti, Zn, Co, and Mn. Replacement with two or more elements is possible. Especially preferred is Al and/or Mg. In the lithium composite oxides shown above, the oxygen atoms may be nonstoichiometric and the oxygen atoms may have been partly replaced with halogen atoms, e.g., fluorine.

A lithium manganese composite oxide having a spinel structure may be used as a positive-electrode active material in the invention. A lithium manganese composite oxide having a spinel structure can be obtained, for example, by mixing a lithium compound with a manganese compound and a compound of one or more typical elements for replacing part of Mn sites and burning the resultant mixture in the air, or by mixing a lithium compound with a manganese compound, burning the resultant mixture in the air to produce a spinel-form lithium manganese composite oxide, and then reacting the oxide with a compound of one or more typical elements. Examples of such typical elements which replace Mn sites include Li, B, Na, Mg, Al, Ca, Zn, Ga, Ge, and the like. Manganese sites can be replaced with two or more elements. Preferred elements which replace Mn sites are Li, Mg, Al, and Ga. Especially preferred are Al and Mg. The amount of the Mn sites replaced by one or more typical elements is 0.05 mol or larger, preferably 0.06 mol or larger, more preferably 0.08 mol or larger, per 2 mol of Mn.

A preferred lithium manganese composite oxide can be represented by the general formula $Li[Mn_{(2-x)}Al_yLi_z]O_4$ (x, y, and z each is a number of 0 or larger and x=y+z, provided that y and z are not simultaneously 0). In the formula, y is generally 0.5 or smaller, preferably 0.25 or smaller, and is more preferably 0.1 or larger, and z is generally 0.1 or smaller, preferably 0.08 or smaller, and is generally 0.02 or larger. When y or z is too small, there are cases where high-temperature characteristics are impaired. On the other hand, too large values of y or z tend to result in a reduced capacity.

In the lithium manganese composite oxide described above, the oxygen atoms may be nonstoichiometric and the oxygen atoms may have been partly replaced with halogen atoms, e.g., fluorine.

A positive electrode can be formed by slurrying a positive-electrode active material, a binder, and a conductive material with a solvent, applying the slurry to a current collector, and drying the coating.

Examples of the binder for use for the positive electrode include poly(vinylidene fluoride), polytetrafluoroethylene, fluorinated poly(vinylene fluoride), EPDM (ethylene/propylene/diene terpolymers), SBR (styrene/butadiene rubbers), NBR (acrylonitrile/butadiene rubbers), fluororubbers, poly(vinyl acetate), poly(methyl methacrylate), polyethylene, nitrocellulose, and the like.

The proportion of the binder in the active-material layer is such that the lower limit thereof is generally 0.1% by weight or higher, preferably 1% by weight or higher, more preferably 5% by weight or higher, and the upper limit thereof is generally 80% by weight or lower, preferably 60% by weight or lower, more preferably 40% by weight or lower, even more preferably 10% by weight or lower. In case where the proportion of the binder is too low, the positive electrode has insufficient mechanical strength because the active material cannot be sufficiently held, and this may impair cell performances such as cycle characteristics. Conversely, too high binder proportions reduce the cell capacity and electrical conductivity.

The active-material layer generally contains a conductive material so as to have enhanced electrical conductivity. Examples of the conductive material include carbonaceous materials such as fine particles of a graphite such as natural graphite or an artificial graphite and fine particles of amorphous carbon such as a carbon black, e.g., acetylene black, and needle coke. The proportion of the conductive material in the active-material layer is such that the lower limit thereof is generally 0.01% by weight or higher, preferably 0.1% by weight or higher, more preferably 1% by weight or higher, and the upper limit thereof is generally 50% by weight or lower, preferably 30% by weight or lower, more preferably 15% by weight or lower. Too low proportions of the conductive material may result in insufficient electrical conductivity, while too high proportions may result in a reduced cell capacity.

As the solvent for slurrying is generally used an organic solvent in which the binder is soluble. For example, use is made of N-methylpyrrolidone, dimethylformamide, dimethylacetamide, methyl ethyl ketone, cyclohexanone, methyl acetate, methyl acrylate, diethyltriamine, N-N-dimethylaminopropylamine, ethylene oxide, tetrahydrofuran, or the like. However, the solvent for slurrying is not limited to these. It is also possible to add a dispersant, thickener, etc. to water and slurry an active material with the aid of a latex of, e.g., an SBR.

As the current collector for the negative electrode is used copper, nickel, stainless steel, nickel-plated steel, or the like. As the current collector for the positive electrode is used aluminum, stainless steel, nickel-plated steel, or the like.

The thickness of the active-material layer is generally about from 10 to 200 $\mu$m.

In the case where an active-material layer has been obtained through coating/drying, it is preferred to densify the layer by, e.g., roller pressing in order to increase the loading density of the active material.

A separator is usually interposed between the positive electrode and the negative electrode. As the separator is used a microporous polymer film. Use may be made of one made of a polyamide, polyester, cellulose acetate, nitrocellulose, polysulfone, polyacrylonitrile, poly(vinylidene fluoride), polytetrafluoroethylene, or polyolefin polymer such as polypropylene, polyethylene, or polybutene. It is also possible to use a nonwoven fabric filter made of glass fibers or the like or a composite nonwoven fabric filter made of glass fibers and polymer fibers. The chemical and electrochemical stability of the separator is an important factor. From this standpoint, polyolefin polymers are preferred. The separator is preferably made of a polyethylene from the standpoint of self-shutoff temperature, which is one of the purposes of battery separators.

In the case of a polyethylene separator, this polyethylene preferably is ultrahigh-molecular polyethylene from the standpoint of high-temperature shape retention. The lower limit of the molecular weight thereof is generally 500,000, preferably 1,000,000, more preferably 1,500,000. The upper limit of the molecular weight thereof is generally 5,000,000, preferably 4,000,000,, more preferably 3,000,000. When the molecular weight thereof is too high, there are cases where the pores of the separator do not close upon heating because of the reduced flowability.

Methods for producing the secondary battery of the invention, which comprises at least a negative electrode, a positive electrode, and the nonaqueous electrolyte solution, are not particularly limited, and a suitable one can be selected from methods in ordinary use.

Furthermore, the shape of the battery is not particularly limited, and use can be made of a cylinder type in which sheet electrodes and separators are arranged spirally, a cylinder type of the inside-out structure employing a combination of pellet electrodes and a separator, a coin type in which pellet electrodes and a separator have been superposed, or the like.

EXAMPLES

The invention will be explained below in more detail by reference to Examples and Comparative Examples, but the invention should not be construed as being limited by these Examples unless the invention departs from the spirit thereof.

In the Examples, hydrolyzates were determined by the following method.

[Determination of Hydrolyzate of Lactone Compound]

Diethyl carbonate was added as a diluted to a sample. This sample was subjected to trimethylsilylation using trimethylchlorosilane and hexamethyldisilazane. The reaction products were centrifuged, and the supernatant was analyzed by gas chromatography using column TC-5HT, manufactured by GL Sciences Inc., helium as a carrier gas, and an FID as a detector to determine the hydrolyzate.

Example 1

In purified γ-butyrolactone (hereinafter referred to as GBL) obtained by the precision distillation of commercial GBL with a distillation column having a theoretical plate number of 50 was dissolved lithium borofluoride ($LiBF_4$) in a proportion of 1 mol/l in a dry argon atmosphere. Thus, an electrolyte solution was prepared. The content of γ-hydroxybutyric acid (hereinafter referred to as GHBA) therein was determined by gas chromatography and, as a result, was found to be 0.8 mmol/kg. This electrolyte solution was used to fabricate a coin cell by the method which will be described later. After three cycles of charge/discharge, the cell in the charged state was held at 85° C. for 72 hours and then discharged to measure the capacity. The retention which is defined as the quotient obtained by dividing this capacity value by the discharge capacity in the cycle before the storage was determined. The results are shown in Table 1.

Example 2

In purified GBL obtained by the precision distillation of commercial GBL with a distillation column having a theoretical plate number of 50 was dissolved $LiBF_4$ in a proportion of 1 mol/l in a dry argon atmosphere. Thus, an electrolyte solution was prepared. The content of GHBA therein was determined by gas chromatography and, as a result, was found to be 0.4 mmol/kg. This electrolyte solution was used to conduct evaluation in the same manner as in Example 1. The results are shown in Table 1.

Example 3

In purified GBL obtained by the precision distillation of commercial GBL with a distillation column having a theoretical plate number of 50 was dissolved $LiPF_6$ in a proportion of 1 mol/l in a dry argon atmosphere. Thus, an electrolyte solution was prepared. The content of GHBA therein was determined by gas chromatography and, as a result, was found to be 0.7 mmol/kg. This electrolyte solution was used to conduct evaluation in the same manner as in Example 1. The results are shown in Table 1.

Example 4

In purified GBL obtained by the precision distillation of commercial GBL with a distillation column having a theoretical plate number of 50 was dissolved vinylene carbonate in a proportion of 5% by weight. Therein was dissolved $LiBF_4$ in a proportion of 1 mol/l in a dry argon atmosphere. Thus, an electrolyte solution was prepared. The content of GHBA therein was determined by gas chromatography and, as a result, was found to be 0.4 mmol/kg. This electrolyte solution was used to conduct evaluation in the same manner as in Example 1. The results are shown in Table 1.

Comparative Example 1

In commercial GBL was dissolved $LiBF_4$ in a proportion of 1 mol/l. Thus, an electrolyte solution was prepared. The content of GHBA therein was determined by gas chromatography and, as a result, was found to be 3.3 mmol/kg. This electrolyte solution was used to conduct evaluation in the same manner as in Example 1. The results are shown in Table 1.

Comparative Example 2

In commercial GBL was dissolved $LiPF_6$ in a proportion of 1 mol/l. Thus, an electrolyte solution was prepared. The content of GHBA therein was determined by gas chromatography and, as a result, was found to be 3.5 mmol/kg. This electrolyte solution was used to conduct evaluation in the same manner as in Example 1. The results are shown in Table 1.

TABLE 1

|  | Content of GHBA in electrolyte solution | Second-cycle charge/discharge efficiency (%) | Retention after 72-hr standing at 85° C. (%) |
|---|---|---|---|
| Example 1 | 0.8 mmol/kg | 95.7 | 65.2 |
| Example 2 | 0.4 mmol/kg | 97.3 | 68.0 |
| Example 3 | 0.7 mmol/kg | 96.0 | 67.3 |
| Example 4 | 0.4 mmol/kg | 98.6 | 70.3 |
| Comparative Example 1 | 3.3 mmol/kg | 90.7 | 45.2 |
| Comparative Example 2 | 3.5 mmol/kg | 91.4 | 48.2 |

Test Example 1
(Evaluation of Secondary Battery)

The electrolyte solutions and secondary batteries in the Examples were evaluated in the following manners.

[Production of Positive Electrode]

To 85% by weight $LiCoO_2$ as a positive-electrode active material were added 6% by weight carbon black and 9% by weight poly(vinylidene fluoride) (trade name, KF-1000; manufactured by Kureha Chemical Co., Ltd.). These components were mixed together and dispersed with N-methylpyrrolidone to prepare a slurry. This slurry was applied evenly on an aluminum foil having a thickness of 20 $\mu$m as a positive-electrode current collector. After the coating was dried, a disk having a diameter of 12.5 mm was punched out of the coated foil. Thus, a positive electrode (hereinafter referred to as positive electrode A) was obtained.

[Production of Negative Electrode]

An artificial graphite powder (trade name, KS-44; manufactured by Timcal Co.) was used which had a value of d for a lattice plane (002 plane), as determined by X-ray diffraction, of 0.336 nm, a crystallite size (Lc) of 100 nm or larger (264 nm), an ash content of 0.04% by weight, a median diameter as determined by the laser diffraction.scattering method of 17 $\mu$m, and a BET specific surface area of 8.9 $m^2/g$ and in which in Raman spectroscopy with an argon ion laser light, the ratio of the intensity for the peak $P_A$ appearing in the 1,580–1,620 $cm^{-1}$ range (peak intensity $I_A$) to the intensity for the peak $P_B$ appearing in the 1,350–1,370 $cm^{-1}$ range (peak intensity $I_B$), i.e., intensity ratio R (=$I_B/I_A$), was 0.15 and the half-band width of the peak appearing in the 1,580–1,620 $cm^{-1}$ range was 22.2 $cm^{-1}$. To 94% by weight the graphite powder was added 6% by weight, on a solid basis, styrene/butadiene rubber (SBR) dispersed in distilled water. The components were mixed together by means of a disperser to prepare a slurry. This slurry was applied evenly on a copper foil having a thickness of 18 $\mu$m as a negative-electrode current collector. After the coating was dried, a disk having a diameter of 12.5 mm was punched out of the coated foil. Thus, an electrode was produced, which was used as a negative electrode (hereinafter referred to as negative electrode A).

[Fabrication of Coin Cell]

A coin cell of the CR2032 type was fabricated in a dry box filled with an argon atmosphere in the following manner. Positive electrode A was placed in a stainless-steel can serving also as a positive-electrode current collector. Thereon was placed negative electrode A through a porous polyethylene separator having a thickness of 25 $\mu$m impregnated with an electrolyte solution. This can was caulked and sealed with a seal plate serving also as a negative-electrode conductor through a gasket for insulation. Thus, a coin cell was fabricated.

[Evaluation of Coin Cell]

A charge-discharge test was conducted at 25° C. and a constant current of 0.5 mA under the conditions of a final charge voltage of 4.2 V and a final discharge voltage of 2.5 V. The value obtained by dividing the discharge capacity in the second cycle by the charge capacity in the second cycle was defined as second-cycle charge/discharge efficiency.

Furthermore, after the cell was charged in the fourth cycle under the same conditions, the cell in the charged state was stored at 85° C. for 72 hours and then discharged. The value obtained by dividing the discharge capacity as measured after the storage after the four cycles by the charge capacity in the fourth cycle was defined as retention.

Examples 5 to 9

Two parts by weight of vinylene carbonate which had been distilled was added to 98 parts by weight of purified GBL obtained by the precision distillation of commercial GBL with a distillation column having a theoretical plate number of 50 to prepare a nonaqueous solvent. Therein were dissolved lithium borofluoride ($LiBF_4$) and lithium hexafluorophosphate ($LiPF_6$) in a dry argon atmosphere so as to result in the compositions shown in Table 2. Thus, electrolyte solutions were prepared (GHBA content, <1 mmol/kg).

Test Example 2

A coin cell was fabricated in the same manner as in Test Example 1. Thereafter, the cell was subjected to two cycles of a charge-discharge test at 25° C. and a constant current of 0.5 mA under the conditions of a final charge voltage of 4.2 V and a final discharge voltage of 3.0 V.

The cell was charged in the third cycle under the same conditions and was stored in the charged state at 85° C. for 72 hours. Thereafter, the cell was subjected to third-cycle discharge and then to a fourth-cycle charge-discharge test.

The value obtained by dividing the discharge capacity in the fourth cycle by the discharge capacity in the second cycle was defined as storability.

The results of the evaluation of this cell are shown in Table 2.

TABLE 2

|  | $LiBF_4$ content (M/L) | $LiPF_6$ content (M/L) | Storability (%) |
|---|---|---|---|
| Example 5 | 1.48 | 0.02 | 75.9 |
| Example 6 | 1.45 | 0.05 | 78.9 |
| Example 7 | 1.40 | 0.10 | 79.8 |
| Example 8 | 1.30 | 0.20 | 80.2 |
| Example 9 | 1.15 | 0.35 | 75.5 |

Example 10 to 15

Coin cells were fabricated in the same manner as in Examples 5 to 9, except that use was made of electrolyte solutions prepared by dissolving $LiBF_4$ and $LiPF_6$ in concentrations of 1.40 M/L and 0.10 M/L, respectively, in nonaqueous solvents having the compositions shown in Table 3. The evaluation results are shown in Table 3.

TABLE 3

| Example | γ-Butyro-lactone (wt %) | Ethylene carbonate (wt %) | Vinylene carbonate (wt %) | Ethylene sulfite (wt %) | Vinylethylene sulfite (wt %) | Storability (%) |
|---|---|---|---|---|---|---|
| 10 | 88 | 10 | 2 | 0 | 0 | 78.5 |
| 11 | 78 | 20 | 2 | 0 | 0 | 74.8 |
| 12 | 68 | 30 | 2 | 0 | 0 | 70.9 |
| 13 | 90 | 10 | 0 | 0 | 0 | 60.5 |
| 14 | 88 | 10 | 0 | 2 | 0 | 77.4 |
| 15 | 88 | 10 | 0 | 0 | 2 | 78.9 |

Example 16

2,6-Di-t-butyl-4-methylpyridine was dissolved in a proportion of 5% by weight in purified GBL obtained by subjecting commercial GBL to precision distillation with a distillation column having a theoretical plate number of 50. Therein was further dissolved sufficiently dried lithium borofluoride (LiBF$_4$) in a proportion of 1 mol/l in a dry argon atmosphere. Thus, an electrolyte solution was prepared (GHBA content, <1 mmol/kg).

Test Example 3

The electrolyte solution obtained in Example 16 was used to fabricate a coin cell in the same manner as in Test Example 1. Thereafter, the cell was subjected to a hundred-cycle charge-discharge test at 25° C. and a constant current of 0.5 mA under the conditions of a final charge voltage of 4.2 V and a final discharge voltage of 3.0 V.

In this test, the value obtained by dividing the discharge capacity in the hundredth cycle by the discharge capacity in the first cycle was defined as proportion of discharge capacity.

The results are shown in Table 4.

Example 17

Evaluation was conducted in the same manner as in Test Example 3, except that use was made of an electrolyte solution (GHBA content, <1 mmol/kg) prepared by dissolving quinoline in a proportion of 5% by weight in purified GBL obtained by subjecting commercial GBL to precision distillation with a distillation column having a theoretical plate number of 50 and further dissolving LiBF$_4$ therein in a proportion of 1 mol/l. The results are shown in Table 4.

Example 18

Evaluation was conducted in the same manner as in Test Example 3, except that use was made of an electrolyte solution (GHBA content, <1 mmol/kg) prepared by dissolving α-picoline in a proportion of 5% by weight in purified GBL obtained by subjecting commercial GBL to precision distillation with a distillation column having a theoretical plate number of 50 and further dissolving LiBF$_4$ therein in a proportion of 1 mol/l. The results are shown in Table 4.

Example 19

Evaluation was conducted in the same manner as in Test Example 3, except that use was made of an electrolyte solution (GHBA content, <1 mmol/kg) prepared by dissolving pyridazine in a proportion of 5% by weight in purified GBL obtained by subjecting commercial GBL to precision distillation with a distillation column having a theoretical plate number of 50 and further dissolving LiBF$_4$ therein in a proportion of 1 mol/l. The results are shown in Table 4.

Example 20

Evaluation was conducted in the same manner as in Test Example 3, except that use was made of an electrolyte solution (GHBA content, <1 mmol/kg) prepared by dissolving 1,2,3-triazine in a proportion of 5% by weight in purified GBL obtained by subjecting commercial GBL to precision distillation with a distillation column having a theoretical plate number of 50 and further dissolving LiBF$_4$ therein in a proportion of 1 mol/l. The results are shown in Table 4.

Example 21

Evaluation was conducted in the same manner as in Test Example 3, except that use was made of an electrolyte solution (GHBA content, <1 mmol/kg) prepared by dissolving 1-methylpyrrole in a proportion of 5% by weight in purified GBL obtained by subjecting commercial GBL to precision distillation with a distillation column having a theoretical plate number of 50 and further dissolving LiBF$_4$ therein in a proportion of 1 mol/l. The results are shown in Table 4.

Example 22

Evaluation was conducted in the same manner as in Test Example 3, except that use was made of an electrolyte solution (GHBA content, <1 mmol/kg) prepared by dissolving pyridine in a proportion of 5% by weight in purified GBL obtained by subjecting commercial GBL to precision distillation with a distillation column having a theoretical plate number of 50, subsequently dissolving vinylene carbonate therein in a proportion of 5% by weight, and further dissolving LiBF$_4$ therein in a proportion of 1 mol/l. The results are shown in Table 4.

TABLE 4

| | Proportion of discharge capacity/% |
|---|---|
| Example 16 | 85 |
| Example 17 | 81 |
| Example 18 | 82 |
| Example 19 | 82 |
| Example 20 | 75 |
| Example 21 | 74 |
| Example 22 | 92 |

Examples 23

A nonaqueous solvent was prepared which was composed of 95% by weight purified GBL obtained by subjecting commercial GBL to precision distillation with a distillation column having a theoretical plate number of 50 and 5% by weight 1-methylpyrrolidone. Therein was dissolved sufficiently dried lithium borofluoride (LiBF$_4$) in a proportion of 1 mol/l in a dry argon atmosphere. Thus, an electrolyte solution (GHBA content, <1 mmol/kg) was prepared.

Test Example 4

The electrolyte solution obtained in Example 23 was used to fabricate a coin cell in the same manner as in Test Example 1. Thereafter, the cell was subjected to a charge-discharge test at 25° C. under the conditions of a final charge voltage of 4.2 V, final discharge voltage of 2.5 V, and constant current of 0.5 mA. The value obtained by dividing the discharge capacity in the second cycle by the charge capacity in the second cycle was taken as second-cycle charge/discharge efficiency.

Furthermore, in the fifth cycle, the cell was charged under the same conditions, subsequently stored in the charged state at 85° C. for 72 hours, and then discharged. In the sixth cycle, the cell was charged again at 25° C. under the same conditions. The capacity value for this charge was divided by the charge capacity in the fourth cycle, and this quotient was taken as capacity retention.

The results are shown in Table 5.

Example 24

An electrolyte solution was prepared and evaluated in the same manner as in Test Example 4, except that 3-methyl-2-oxazolidone was used in place of 1-methylpyrrolidone. The results are shown in Table 5.

Example 25

An electrolyte solution was prepared and evaluated in the same manner as in Test Example 4, except that 1,3-dimethyl-2-imidazolidinone was used in place of 1-methylpyrrolidone. The results are shown in Table 5.

Example 26

An electrolyte solution was prepared and evaluated in the same manner as in Test Example 4, except that 1-vinylpyrrolidone was used in place of 1-methylpyrrolidone. The results are shown in Table 5.

Example 27

A nonaqueous solvent was prepared which was composed of 90% by weight purified GBL obtained by the precision distillation of commercial GBL with a distillation column having a theoretical plate number of 50, 5% by weight 1-vinylpyrrolidone, and 5% by weight vinylene carbonate. $LiBF_4$ was dissolved therein in a concentration of 1 mmol/l to obtain an electrolyte solution (GHBA content, <1 mmol/kg). Cell evaluation was conducted by the method described in Test Example 4, and the results thereof are shown in Table 5.

Example 28

A nonaqueous solvent was prepared which was composed of 19% by weight purified GBL obtained by the precision distillation of commercial GBL with a distillation column having a theoretical plate number of 50, 19% by weight ethylene carbonate, 60% by weight ethyl methyl carbonate, and 2% by weight 1-methylpyrrolidone. Sufficiently dried $LiBF_4$ was dissolved therein in a concentration of 1 mol/l in a dry argon atmosphere to obtain an electrolyte solution (GHBA content, <1 mmol/kg). Cell evaluation was conducted by the method described in Test Example 4, and the results thereof are shown in Table 5.

Example 29

A nonaqueous solvent was prepared which was composed of 18% by weight purified GBL obtained by the precision distillation of commercial GBL with a distillation column having a theoretical plate number of 50, 18% by weight ethylene carbonate, 60% by weight ethyl methyl carbonate, 2% by weight 1-methylpyrrolidone, and 2% by weight vinylene carbonate. Sufficiently dried $LiBF_4$ was dissolved therein in a concentration of 1 mol/l in a dry argon atmosphere to obtain an electrolyte solution (GHBA content, <1 mmol/kg). Cell evaluation was conducted by the method described in Test Example 4, and the results thereof are shown in Table 5.

Example 30

A nonaqueous solvent was prepared which was composed of 18% by weight purified GBL obtained by the precision distillation of commercial GBL with a distillation column having a theoretical plate number of 50, 18% by weight ethylene carbonate, 60% by weight ethyl methyl carbonate, 2% by weight 1-methylpyrrolidone, and 2% by weight vinylene carbonate. Sufficiently dried lithium hexafluorophosphate ($LiPF_6$) was dissolved therein in a concentration of 1 mol/l in a dry argon atmosphere to obtain an electrolyte solution (GHBA content, <1 mmol/kg). Cell evaluation was conducted by the method described in Test Example 4, and the results thereof are shown in Table 5.

Example 31

A nonaqueous solvent was prepared which was composed of 18% by weight purified GBL obtained by the precision distillation of commercial GBL with a distillation column having a theoretical plate number of 50, 18% by weight ethylene carbonate, 60% by weight ethyl methyl carbonate, 2% by weight 1-methylpyrrolidone, and 2% by weight vinylene carbonate. Sufficiently dried $LiBF_4$ was dissolved therein in a concentration of 0.5 mol/l in a dry argon atmosphere. Furthermore, sufficient dried $LiPF_6$ was dissolved therein in a concentration of 0.5 mol/l in a dry argon atmosphere to obtain an electrolyte solution (GHBA content, <1 mmol/kg). Cell evaluation was conducted by the method described in Test Example 4, and the results thereof are shown in Table 5.

TABLE 5

| | Second-cycle charge/discharge efficiency (%) | Capacity retention (%) |
|---|---|---|
| Example 23 | 99 | 71 |
| Example 24 | 98 | 73 |
| Example 25 | 97 | 71 |
| Example 26 | 98 | 72 |
| Example 27 | 96 | 70 |
| Example 28 | 99 | 73 |
| Example 29 | 99 | 75 |
| Example 30 | 99 | 76 |
| Example 31 | 99 | 78 |

Example 32

A natural graphite powder was used which had a value of d for a lattice plane (002 plane), as determined by X-ray diffraction, of 0.336 nm, a crystallite size (Lc) of 100 nm or larger (652 nm), an ash content of 0.07% by weight, a median diameter as determined by the laser diffraction.scattering method of 12 μm, and a BET specific surface area of 7.5 m$^2$/g and in which in Raman spectroscopy with an argon ion laser light, the ratio of the intensity for the peak $P_A$ appearing in the 1,570–1,620 cm$^{-1}$ range (peak intensity $I_A$) to the intensity for the peak $P_B$ appearing in the 1,300–1,400 cm$^{-1}$ range (peak intensity $I_B$), i.e., intensity ratio R (=$I_B/I_A$), was 0.12 and the half-band width of the peak appearing in the 1,570–1,620 cm$^{-1}$ range was 19.9 cm$^{-1}$. With 94 parts by weight of this graphite powder was mixed 6 parts by weight of poly(vinylidene fluoride). These components were dispersed with N-methyl-2-pyrrolidone to prepare a slurry. This slurry was applied evenly on a copper foil having a thickness of 18 μm as a negative-electrode current collector. After the coating was dried, a disk having a diameter of 12.5 mm was punched out of the coated foil. Thus, a negative electrode (hereinafter referred to as negative electrode B) was obtained.

An electrolyte solution was prepared in the following manner using sufficiently dried LiPF$_6$ as a solute. To purified GBL obtained by subjecting commercial GBL to precision distillation with a distillation column having a theoretical plate number of 50 were added, in a dry argon atmosphere, vinylene carbonate and phenylethylene carbonate in proportions of 1% by weight and 1% by weight (each in terms of proportion based on the total solvent weight), respectively. Furthermore, the LiBF$_4$ was dissolved therein in a proportion of 1.5 mol/l in a dry argon atmosphere to obtain an electrolyte solution (GHBA content, <1 mmol/kg).

Using the negative electrode B, positive electrode A prepared in Test Example 1, and the electrolyte solution described above, a coin cell was fabricated in the same manner as in Test Example 1.

This cell was subjected to five cycles of charge-discharge at 25° C. and a constant current of 0.5 mA under the conditions of a final charge voltage of 4.2 V and a final discharge voltage of 3 V. The cell thus stabilized was then stored in the charged state at 85° C. for 3 days. The cell after the storage was discharge at 25° C. and a constant current of 0.5 mA to a final discharge voltage of 3 V. Subsequently, this cell was charged and discharged at a constant current of 0.5 mA under the conditions of a final charge voltage of 4.2 V and a final discharge voltage of 3 V to examine the capacity after the storage. The discharge capacity after the storage relative to the discharge capacity before the storage, which was taken as 100, is shown in Table 6.

Example 33

A coin cell was fabricated and evaluated in the same manner as in Example 32, except that use was made of an electrolyte solution (GHBA content, <1 mmol/kg) prepared by adding vinylene carbonate and succinic anhydride. in proportions of 1% by weight and 0.2% by weight, respectively, to purified GBL obtained by the precision distillation of commercial GBL with a distillation column having a theoretical plate number of 50 and further dissolving LiBF$_4$ therein in a proportion of 1.5 mol/l. The results are shown in Table 6.

Example 34

A coin cell was fabricated and evaluated in the same manner as in Example 32, except that use was made of an electrolyte solution (GHBA content, <1 mmol/kg) prepared by adding vinylene carbonate and maleic anhydride in proportions of 1% by weight and 0.2% by weight, respectively, to purified GBL obtained by the precision distillation of commercial GBL with a distillation column having a theoretical plate number of 50 and further dissolving LiBF$_4$ therein in a proportion of 1.5 mol/l. The results are shown in Table 6.

TABLE 6

|  | Capacity after storage relative to the capacity of 100 before storage (%) |
|---|---|
| Example 32 | 89 |
| Example 33 | 88 |
| Example 34 | 89 |

As apparent from Table 6, the cells of the Examples had improved discharge capacities after the storage relative to the discharge capacities before the storage. Namely, the electrolyte solutions were effective in attaining an improvement in high-temperature storability.

Example 35

[Preparation of Electrolyte Solution]

An electrolyte solution was prepared in the following manner using sufficiently dried LiBF$_4$ as a solute. In a mixture (2:8 by volume) of ethylene carbonate and purified GBL obtained by the precision distillation of commercial GBL with a distillation having a theoretical plate number of 50 were dissolved, in a dry argon atmosphere, vinylene carbonate in a proportion of 2% by weight based on the total weight of the mixture and a fluoroalkyl polyoxyethylene ethanol having perfluoroalkyl groups having 2 to 10 carbon atoms (trade name, ZONYL FSO-100; manufactured by Du Pont) in a proportion of 0.2% by weight based on the total weight of the mixture. Furthermore, the LiBF$_4$ was dissolved therein in a proportion of 1.5 mol/l in a dry argon atmosphere to obtain an electrolyte solution (GHBA content, <1 mmol/kg).

[Production of Negative Electrode]

A natural graphite powder (trade name, NG-7; manufactured by The Kansai Coke and Chemicals Co.) was used as a negative electrode active material, which had a value of d for a lattice plane (002 plane), as determined by X-ray diffraction, of 0.336 nm, a crystallite size (Lc) of 100 nm or larger (652 nm), an ash content of 0.07% by weight, a median diameter as determined by the laser diffraction.scattering method of 12 μm, and a BET specific surface area of 7.5 m$^2$/g and in which in Raman spectroscopy with an argon ion laser light, the ratio of the intensity for the peak P$_A$ appearing in the 1,580–1,620 cm$^{-1}$ range (peak intensity I$_A$) to the intensity for the peak P$_B$ appearing in the 1,350–1,370 cm$^{-1}$ range (peak intensity I$_B$), i.e., intensity ratio R (=I$_B$/I$_A$), was 0.12 and the half-band width of the peak appearing in the 1,580–1,620 cm$^{-1}$ range was 19.9 cm$^{-1}$. With 95 parts by weight of this graphite powder was mixed 5 parts by weight of poly(vinylidene fluoride). These components were dispersed with N-methyl-2-pyrrolidone to prepare a slurry. This slurry was applied evenly on a copper foil having a thickness of 18 μm as a negative-electrode current collector. After the coating was dried, a disk having a diameter of 12.5 mm was punched out of the coated foil. Thus, a negative electrode (hereinafter referred to as negative electrode C) was obtained.

Using the negative electrode C, positive electrode A prepared in Test Example 1, and the electrolyte solution described above, a coin cell was fabricated in the same manner as in Test Example 1.

The cell fabricated in Example 35 given above was subjected to three cycles of charge-discharge at 25° C. and a constant current of 0.8 mA under the conditions of a final charge voltage of 4.2 V and a final discharge voltage of 3.0 V. Thereafter, the cell was subjected to a test in which it was charged at 0.8 mA up to 4.2 V by the constant-current constant-voltage method and discharged to 3 V at a discharging current of 0.2C (0.8 mA), 1C (4 mA), or 2C (8 mA).

"1C" means the value of current at which full charge takes 1 hour, and "0.2C" and "2C" mean the values of current which are ⅕ and 2 times, respectively, that current value for full charge.

As an index to discharge load characteristics was used the discharge rates defined by the following equations. The larger the values thereof, the better the load characteristics.

1C/0.2C Discharge rate=(1C discharge capacity/0.2C discharge capacity)×100 (%)

2C/0.2C Discharge rate=(2C discharge capacity/0.2C discharge capacity)×100 (%)

The discharge rates of the respective cells are shown in Table 7.

TABLE 7

|  |  | 1C/0.2C Discharge rate | 2C/0.2C Discharge rate |
|---|---|---|---|
| Example 35 | EC/GBL with surfactant | 83% | 41% |

Due to the addition of a nonionic fluorochemical surfactant, the electrolyte solution had a reduced surface tension and showed the enhanced ability to infiltrate into the separator, positive electrode, and negative electrode. Consequently, the cell could work normally.

While the invention has been described in detail and with reference to specific embodiments thereof, it will be apparent to one skilled in the art that various changes and modifications can be made therein without departing from the spirit and scope thereof.

This application is based on Japanese patent application filed on Jul. 10, 2001 (Patent Application No. 2001-208992) and a Japanese patent application filed on Jul. 16, 2001 (Patent Application No. 2001-214638), the entire contents thereof being hereby incorporated by reference.

<INDUSTRIAL APPLICABILITY>

Accordance to the invention, a nonaqueous electrolyte solution can be provided which is excellent in high-temperature storage characteristics, cycle characteristics, and capacity retention characteristics and in various cell characteristics in a wide temperature range and safety such as firing properties. A secondary battery employing this electrolyte solution can also be provided.

What is claimed is:

1. A nonaqueous electrolyte solution for secondary batteries obtained by dissolving a lithium salt in a nonaqueous solvent, wherein the nonaqueous solvent is a solvent mainly comprising a lactone compound and the content of hydroxy carboxylic acids in the electrolyte solution is 1 mmol/kg or lower but greater than 0.

2. The electrolyte solution as claimed in claim 1, wherein the lactone compound comprises γ-butyrolactone.

3. The electrolyte solution as claimed in claim 1, wherein the lithium salt comprises $LiBF_4$ or $LiPF_6$.

4. The electrolyte solution as claimed in claim 1, wherein the lithium salt comprises $LiBF_4$ and $LiPF_6$.

5. The electrolyte solution as claimed in claim 1, wherein the nonaqueous solvent additionally comprises a nitrogen-containing aromatic heterocyclic compound.

6. The electrolyte solution as claimed in claim 1, wherein the nonaqueous solvent additionally comprises a nitrogen-containing heterocyclic compound represented by the following formula (I):

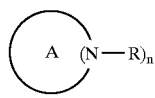

(I)

(wherein A represents a nitrogen-containing heterocycle having a carbonyl group, R represents an alkyl group, an alkenyl group, or a (hetero)aryl group, and n represents a natural number, provided that when n is 2 or larger, the R's may be different from each other).

7. The electrolyte solution as claimed in claim 1, wherein the nonaqueous solvent additionally comprises a compound selected from the group consisting of vinylene carbonate compounds and vinylethylene carbonate compounds.

8. The electrolyte solution as claimed in claim 1, wherein the nonaqueous solvent additionally comprises a compound selected from the group consisting of phenylethylene carbonate compounds, phenylvinylene carbonate compounds, and acid anhydrides.

9. The electrolyte solution as claimed in claim 1, which additionally comprises at least one compound selected from the group consisting of vinylene carbonate, ethylene sulfite, vinylethylene carbonate, propanesultone, phenylethylene carbonate, and cyclic carboxylic anhydrides in an amount of from 0.1 to 10% by weight.

10. The electrolyte solution as claimed in claim 1, wherein the lactone compound comprises 50% by weight or more γ-butyrolactone, and the electrolyte solution additionally comprises at least one compound selected from the group consisting of vinylene carbonate, ethylene sulfite, vinylethylene carbonate, propanesultone, phenylethylene carbonate, and cyclic carboxylic anhydrides in an amount of from 0.1 to 10% by weight, and the lithium salt is $LiBF_4$.

11. The nonaqueous electrolyte solution as claimed in claim 1, which additionally comprises a nonionic fluorochemical surfactant.

12. The electrolyte solution claimed in claim 1, wherein the content of hydroxy carboxylic acids in the electrolyte solution is from 0.1 to 1 mmol/kg.

13. The electrolyte solution claimed in claim 12, wherein the content of hydroxy carboxylic acids in the electrolyte solution is from 0.1 to 0.8 mmol/kg.

14. The electrolyte solution claimed in claim 13, wherein the content of hydroxy carboxylic acids in the electrolyte solution is from 0.1 to 0.5 mmol/kg.

15. A nonaqueous-electrolyte-solution secondary battery comprising at least a negative electrode comprising lithium metal, a lithium alloy, or a material capable of occluding and releasing lithium, a positive electrode comprising a material capable of occluding and releasing lithium, and an electrolyte solution obtained by dissolving a lithium salt in a nonaqueous solvent, wherein the nonaqueous solvent is a solvent mainly comprising a lactone compound and the content of hydroxy carboxylic acids in the electrolyte solution is 1 mmol/kg or lower but greater than 0.

16. The nonaqueous-electrolyte-solution secondary battery as claimed in claim 15, wherein the negative-electrode material capable of occluding and releasing lithium comprises a carbonaceous material having a value of d for a lattice plane (002 plane) in X-ray diffraction of from 0.335 to 0.34 nm and/or an oxide of at least one metal selected from the group consisting of Sn, Si, and Al and/or a lithium alloy.

17. The electrolyte solution claimed in claim 15, wherein the content of hydroxy carboxylic acids in the electrolyte solution is from 0.1 to 1 mmol/kg.

18. The electrolyte solution claimed in claim 17, wherein the content of hydroxy carboxylic acids in the electrolyte solution is from 0.1 to 0.8 mmol/kg.

19. The electrolyte solution claimed in claim 18, wherein the content of hydroxy carboxylic acids in the electrolyte solution is from 0.1 to 0.5 mmol/kg.

* * * * *